(12) United States Patent
Baek et al.

(10) Patent No.: US 10,289,376 B2
(45) Date of Patent: May 14, 2019

(54) METHOD FOR DISPLAYING VIRTUAL OBJECT IN PLURAL ELECTRONIC DEVICES AND ELECTRONIC DEVICE SUPPORTING THE METHOD

(71) Applicant: Samsung Electronics Co., Ltd., Gyeonggi-do (KR)

(72) Inventors: Sangchul Baek, Seoul (KR); Kyungtae Kim, Gyeonggi-do (KR); Suyoung Park, Gyeonggi-do (KR); Jaeyung Yeo, Gyeonggi-do (KR); Youngkeun Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 88 days.

(21) Appl. No.: 15/343,351

(22) Filed: Nov. 4, 2016

(65) Prior Publication Data

US 2017/0131964 A1    May 11, 2017

(30) Foreign Application Priority Data

Nov. 6, 2015 (KR) .................. 10-2015-0155577

(51) Int. Cl.
| | |
|---|---|
| *G06T 19/00* | (2011.01) |
| *G06F 3/14* | (2006.01) |
| *G09G 5/12* | (2006.01) |
| *G06F 3/147* | (2006.01) |
| *G09G 3/00* | (2006.01) |

(52) U.S. Cl.
CPC ............ *G06F 3/1462* (2013.01); *G06F 3/147* (2013.01); *G06F 3/1423* (2013.01); *G06F 3/1438* (2013.01); *G06F 3/1454* (2013.01); *G06T 19/006* (2013.01); *G09G 3/002* (2013.01); *G09G 5/12* (2013.01); *G09G 2370/02* (2013.01); *G09G 2370/022* (2013.01); *G09G 2370/12* (2013.01); *G09G 2370/16* (2013.01)

(58) Field of Classification Search
CPC .... G06F 3/1462; G06F 3/1423; G06F 3/1438; G06F 3/1454; G06T 19/006; G09G 3/002; G09G 5/12
See application file for complete search history.

(56) References Cited

U.S. PATENT DOCUMENTS 8,576,276 B2    11/2013  Bar-Zeev et al.
2008/0244421 A1*  10/2008  Chen .................. H04L 12/2809
                                                        715/762

(Continued)

OTHER PUBLICATIONS

Keri Moran et al., Optimizing Windows Apps for Continuum 2-703, Microsoft Corporation, Apr. 30, 2015, pp. 1-91.

*Primary Examiner* — Ryan R Yang
(74) *Attorney, Agent, or Firm* — Cha & Reiter, LLC

(57) ABSTRACT

An electronic device and method are provided. The electronic device includes a display, a communication unit and a processor, which implements the method, including: receiving application related information from at least one external device, detecting a physical shape of an external screen to set a reference for displaying a virtual object corresponding to the received application related information, and displaying the virtual object in a region of the display based on the set reference for the received application related information.

16 Claims, 15 Drawing Sheets

(56) References Cited

U.S. PATENT DOCUMENTS

| 2013/0044128 A1* | 2/2013 | Liu ......................... G09G 5/00 |
| | | 345/633 |
| 2014/0002444 A1* | 1/2014 | Bennett .................. G06F 3/012 |
| | | 345/419 |
| 2016/0209994 A1* | 7/2016 | Kaufthal ............... G06F 9/4443 |
| 2016/0357491 A1* | 12/2016 | Oya .................. G02B 27/0172 |

* cited by examiner

FIG. 6A
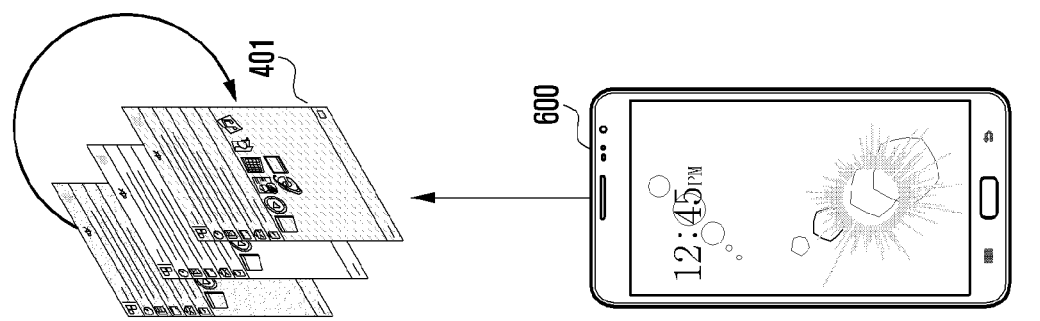
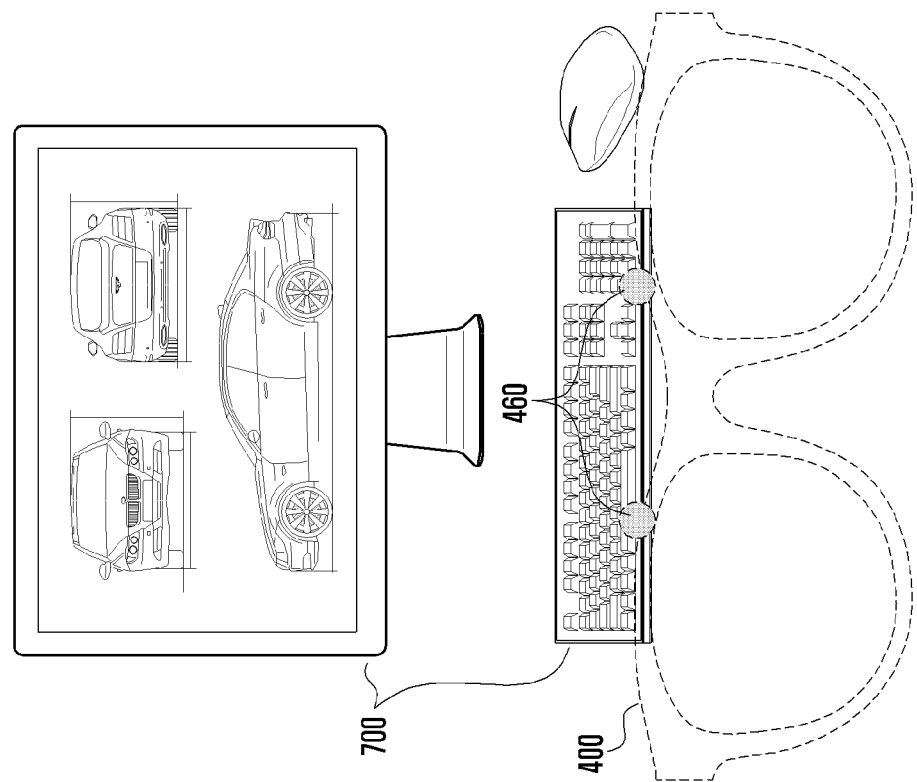

FIG. 8A
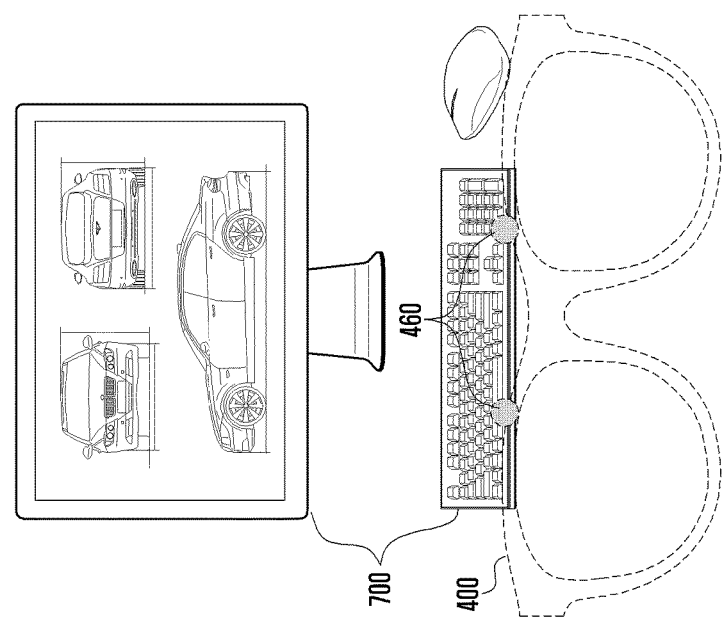
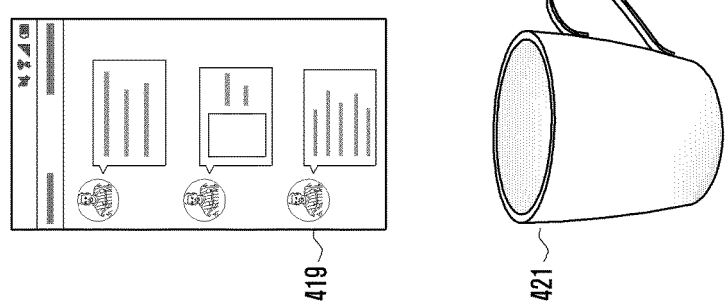

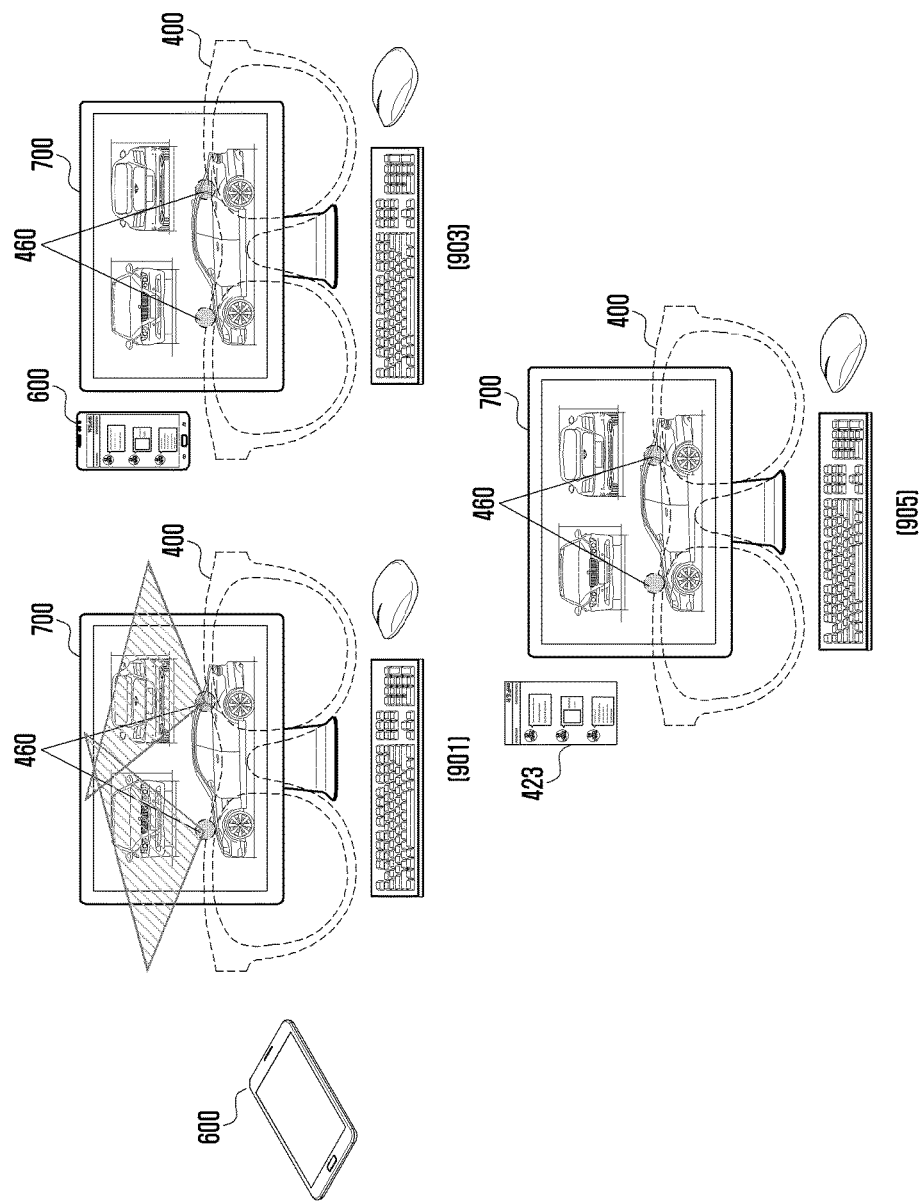

METHOD FOR DISPLAYING VIRTUAL OBJECT IN PLURAL ELECTRONIC DEVICES AND ELECTRONIC DEVICE SUPPORTING THE METHOD

CLAIM OF PRIORITY

The present application is related to and claims benefit under 35 U.S.C. § 119(a) of Korean patent application filed on Nov. 6, 2015 in the Korean Intellectual Property Office and assigned serial number 10-2015-0155577, the entire disclosure of which is hereby incorporated by reference.

TECHNICAL FIELD

The present disclosure relates to a method for displaying one or more virtual objects in a plurality of electronic devices and an electronic device supporting the method.

BACKGROUND

With the development of technology, wearable electronic devices (e.g., smart watches and smart bands) that are communicatively connected to an electronic device (e.g., a smart phone) through short-range wireless communication have appeared in the market. Such wearable electronic devices provide new experiences to users through various kinds of notification services, call services, email/SNS confirmation functions, and exercise measurement services. The wearable electronic devices are of varying types, some of which can be detachably coupled to a part of a human body or clothing, such as head-mounted displays, smart glasses, smart watches or wristbands, contact lenses type device, ring-shaped devices, shoe-type devices, clothing-type devices, and glove-type devices.

As the resolution and the operational speed of electronic device displays are increased and the performance of a graphic processing devices are improved, a virtual reality display, which was previously operated only on a large-scale appliances, has recently become increasingly miniaturized and light-weight. For example, a user of an electronic device can view 3-Dimensional (3D) images, which could previously be viewed only on a 3D television, through a small-sized virtual reality display device, and can also experience 360-degree panoramic images, which had low utilization in the past, through the virtual reality display device. The user of the electronic device can thus feel a sense of reality and virtual presence, which is unavailable through existing PC monitors or smart phone, through Head-Mounted Display (HMD) equipment capable of sensing movements of a head through an acceleration sensor of the HMD equipment.

SUMMARY

A user who uses a plurality of electronic devices may independently use applications included in the respective electronic devices. However, if a new event occurs, for example, if a text message or a call is received from another electronic device, in a state where compatibility or synchronization of the applications of the respective electronic devices has been reduced, a user utilizing a particular electronic device must individually confirm the new event through many corresponding electronic devices, causing inconvenience in usage.

Further, although the screen sizes of the plurality of electronic devices are individually different from one another, there is a limit in the fact that the respective applications are performed based on hardwired configurations (e.g., screen sizes and supported resolution) implemented by the respective electronic devices.

Various embodiments to be described later provide a method for displaying a virtual object and an electronic device that support the method.

In accordance with an aspect of the present disclosure, an electronic device is disclosed, including a display, a communication unit, and a processor electrically coupled to the communication unit. The processor may receive application related information from at least one external device, set a reference for displaying a virtual object corresponding to the received application related information by detecting a physical shape of an external screen of the at least one external device, and display the virtual object on the display in a region based on the set reference for the received application related information.

In accordance with another aspect of the present disclosure, a method is disclosed, including: receiving application related information from at least one external device, detecting a physical shape of an external screen to set a reference for displaying a virtual object corresponding to the received application related information, and displaying the virtual object in a region of a display based on the set reference for the received application related information. According to the various embodiments of the present disclosure, the electronic device can display an application related virtual object of another external device on a virtual region that is within a predetermined distance from a screen of one external device, and thus a user can perform tasks more conveniently through an application that is displayed on an extended virtual screen.

According to the various embodiments of the present disclosure, the electronic device can change the virtual object being displayed when an event (e.g., text message reception) of another external device is updated, and thus a user can perform tasks more conveniently.

According to the various embodiments of the present disclosure, the virtual object that is displayed by the electronic device can be edited through an input device of one external device, and thus a user can perform related functions more easily.

BRIEF DESCRIPTION OF THE DRAWINGS

FIG. 6A and FIG. 6B are diagrams illustrating display of virtual objects through an electronic device according to various embodiments of the present disclosure;

FIG. 8A and FIG. 8B are diagrams illustrating display of virtual objects through an electronic device according to various embodiments of the present disclosure;

FIG. 9 is a diagram illustrating display of virtual objects through an electronic device according to various embodiments of the present disclosure;

DETAILED DESCRIPTION

Figure 1:
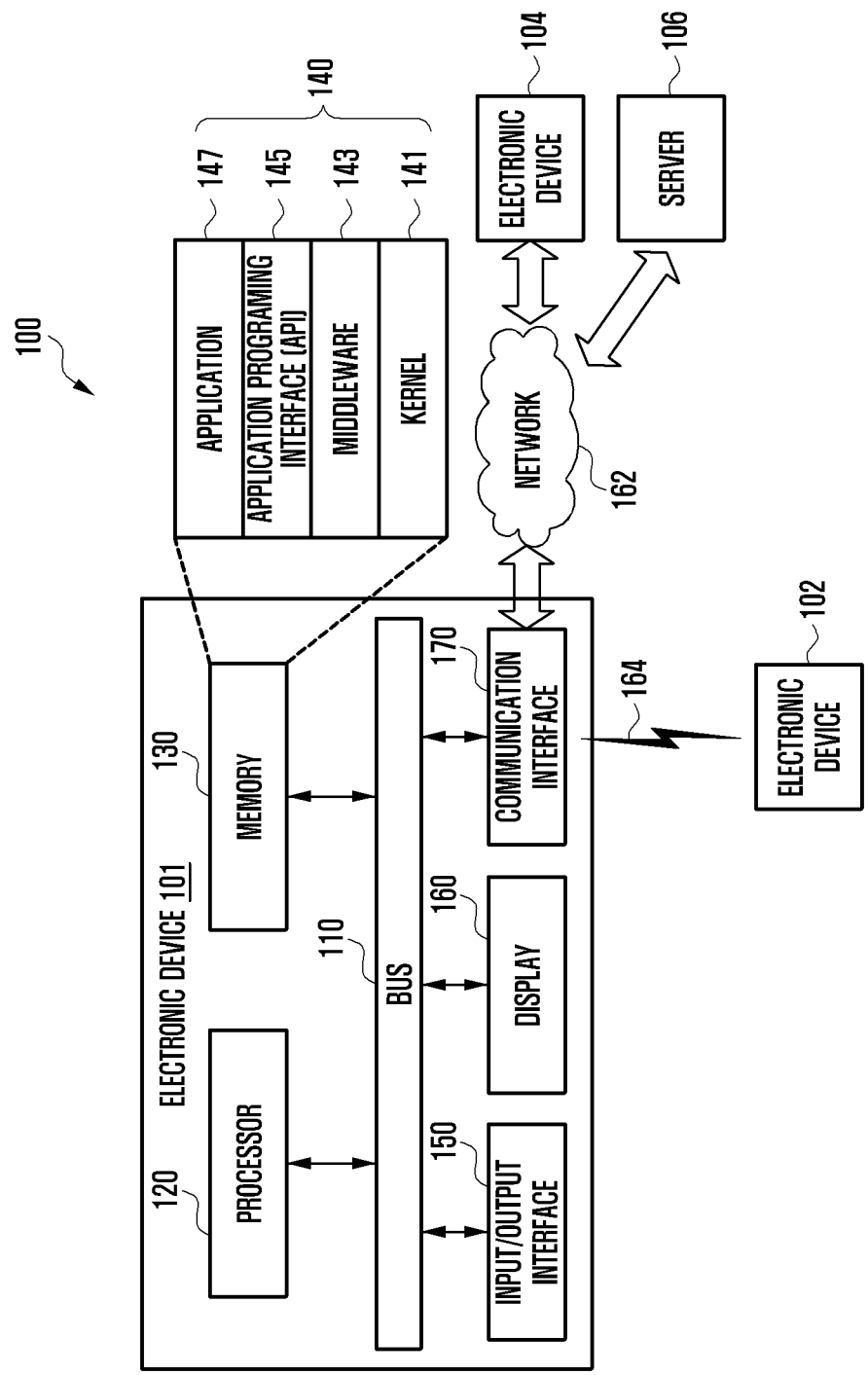
FIG. 1 is a block diagram illustrating a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as mere examples. Accordingly, those of ordinary skill in the art will recognize that various changes and modifications of the embodiments described herein can be made without departing from the present disclosure. In addition, descriptions of well-known functions and implementations may be omitted for clarity and conciseness.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the present disclosure.

In the case where a component is referred to as being "connected" or "accessed" to of her component, it should be understood that not only the component is directly connected or accessed to the other component, but also there may exist another component between them. Meanwhile, in the case where a component is referred to as being "directly connected" or "directly accessed" to other component, it should be understood that there is no component there between.

The terms used in the present disclosure are used to describe specific various embodiments, and are not intended to limit the present disclosure. As used herein, the singular forms are intended to include the plural forms as well, unless the context clearly indicates otherwise.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch.

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

Other embodiments of the electronic device may include various medical devices (for example, various kinds of portable medical measuring device (blood glucose meter, heart rate meter, blood pressure meter, or a temperature measuring instrument, etc.), MRA (magnetic resonance angiography), MRI (magnetic resonance imaging), CT (computed tomography), camcorder, or ultrasound devices, etc.), navigation devices, GPS receiver (global positioning system receiver), EDR (event data recorder), FDR (flight data recorder), automotive entertainment ("infotainment") devices, marine electronic equipment (e.g., marine navigation systems, gyrocompass, etc.), aviation electronics (avionics), security devices, automotive audio equipment (e.g., head units), industrial or household robots, financial institutions, ATM (automatic teller machines), retail POS (point of sale) devices, or Internet devices (e.g., "internet of things") in addition to other various appliances, fixtures and the like (e.g., light bulbs, various sensors, electric or gas meters, sprinkler systems, fire alarms, thermostats, street lights and illumination, toaster oven appliances and the like, fitness equipment, hot water tank or boiler installations, heaters and other climate control devices, etc.).

Some embodiments in accordance, the electronic device furniture or a building/structure of the portion, an electronic board, an electronic sign-receiving device, the projector, or the various measuring devices (e.g. water, electricity, gas, or a radio wave measuring equipment, etc.) may include at least one of. In various embodiments, the electronic device may be one or more combinations of the various devices described above. Electronic device according to some embodiments may be a flexible electronics. In addition, an electronic device, in accordance with various embodiments of the present disclosure is not limited to the above-described device, it may include a new electronic device, in accordance with technological development. In this document, the term user equipment to use a human or an electronic device using the electronic device may refer to for example, AI-enabled (artificial intelligence) electronic device.

FIG. 1 is a block diagram illustrating a network environment 100 including therein an electronic device 101 in accordance with an embodiment of the present disclosure. Referring to FIG. 1, the electronic device 101 may include, but not limited to, a bus 110, a processor 120, a memory 130, an input/output interface 150, a display 160, and a communication interface 170.

The bus 110 may be a circuit designed for connecting the above-discussed elements and communicating data (e.g., a control message) between such elements.

The processor 120 may receive commands from the other elements (e.g., the memory 130, the input/output interface 150, the display 160, or the communication interface 170, etc.) through the bus 110, interpret the received commands, and perform the arithmetic or data processing based on the interpreted commands.

The memory 130 may store therein commands or data received from or created at the processor 120 or other elements (e.g., the input/output interface 150, the display 160, or the communication interface 170, etc.). The memory 130 may include programming modules 140 such as a kernel 141, a middleware 143, an application programming interface (API) 145, and an application 147. Each of the programming modules may be implemented by software, firmware, hardware, and any combination thereof.

The kernel 141 may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, or the like.

The input/output interface 150 may deliver commands or data, entered by a user through an input/output unit (e.g., a sensor, a keyboard, or a touch screen), to the processor 120, the memory 130, or the communication interface 170 via the bus 110.

The display (e.g., display "module") 160 may include, for example, a liquid crystal display (LCD), a light emitting diode (LED) display, an organic LED (OLED) display, a micro electro mechanical system (MEMS) display, or an electronic paper display. The display 160 may display various types of contents (e.g., text, images, videos, icons, or symbols) for users. The display module 160 may include a touch screen, and may receive, for example, a touch, gesture, proximity, or hovering input by using an electronic device or a part of the user's body.

The communication interface 170 may perform a communication between the electronic device 101 and any external electronic device (e.g., the electronic device 104 of the server 106). For example, the communication interface 170 may communicate with any external device by being connected with a network 162 through a wired or wireless communication, such as communicative connections 164 and 162.

The wireless communication may include, but not limited to, at least one of WiFi (Wireless Fidelity), BT (Bluetooth), NFC (Near Field Communication), GNSS (Global navigation satellite system), or a cellular communication (e.g., LTE, LTE-A, CDMA, WCDMA, UMTS, WiBro, or GSM, etc.). The GNSS may include at least one of Global Positioning System (GPS), Global Navigation Satellite System (Glonass), Beidou Navigation Satellite System (hereinafter, "Beidou"), Galileo, or the European global satellite-based navigation system. Hereinafter, the terms "GPS" and the "GNSS" may be interchangeably used herein. The wired communication may include, but not limited to, at least one of USB (Universal Serial Bus), HDMI (High Definition Multimedia Interface), RS-232 (Recommended Standard 232), or POTS (Plain Old Telephone Service). The network 162 includes, as a telecommunications network at least one of a computer network (e.g., Local Area Network (LAN) or Wide Area Network (WAN)), the Internet, and a telephone network.

The types of the first and second external electronic devices 102 and 104 may be the same as or different from the type of the electronic device 101. The server 106 may include a group of one or more servers. A portion or all of operations performed in the electronic device 101 may be performed in one or more other electronic devices 102 or 104 or the server 106. In the case where the electronic device 101 performs a certain function or service automatically or in response to a request, the electronic device 101 may request at least a portion of functions related to the function or service from another electronic device 102 or 104 or the server 106 instead of or in addition to performing the function or service for itself. The other electronic device 102 or 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Figure 2:
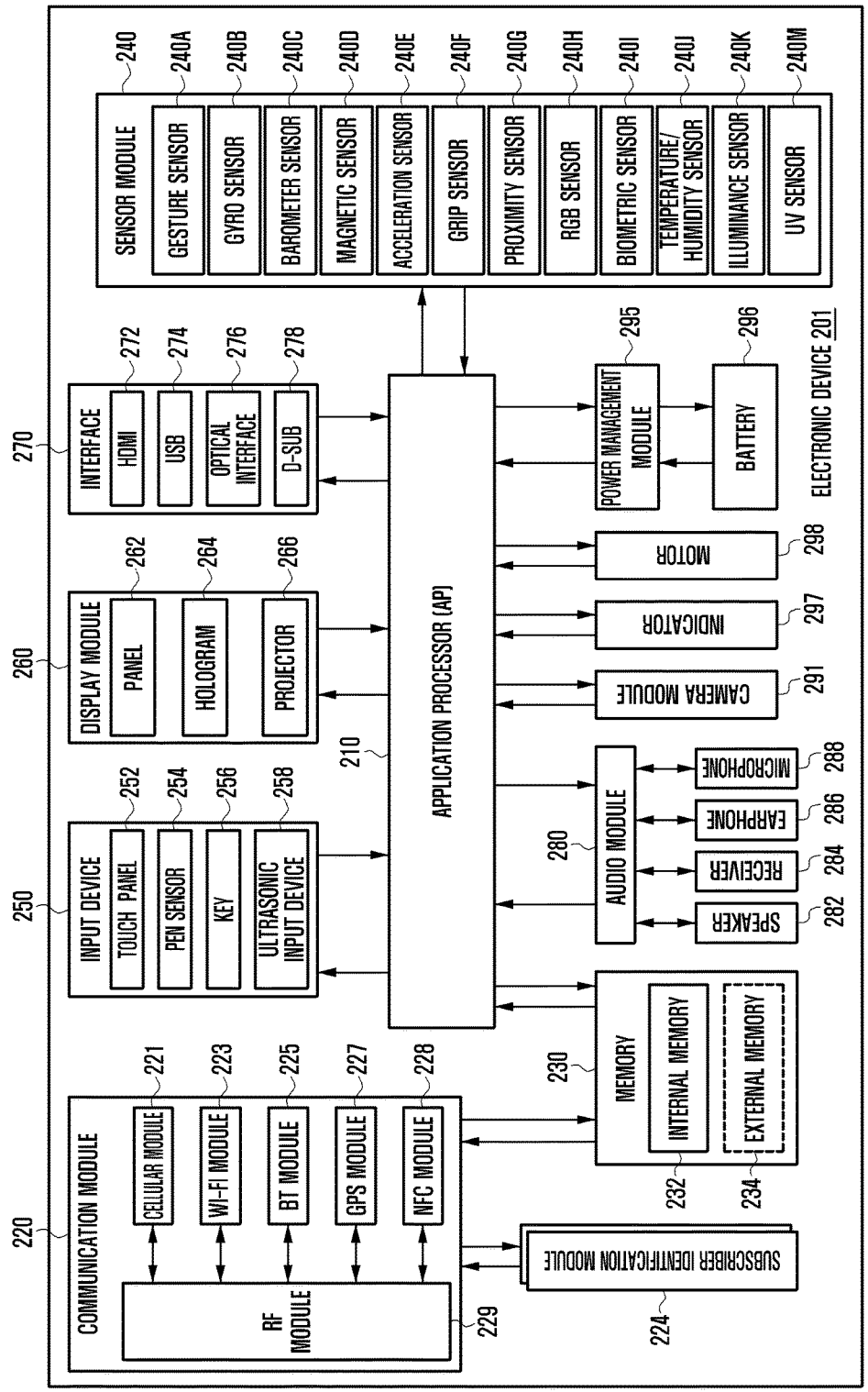
FIG. 2 is a block diagram of an electronic device according to various embodiments of the present disclosure.

FIG. 2 is a block diagram illustrating an electronic device 201 in accordance with an embodiment of the present disclosure. The electronic device 201 may form, for example, the whole or part of the electronic device 101 shown in FIG. 1. Referring to FIG. 2, the electronic device 201 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 170) may perform a data communication with any other electronic device (e.g., the electronic device 104 or the server 106) connected to the electronic device 201 (e.g., the electronic device 101) through the network. According to an embodiment, the communication module 220 may include therein a cellular module 221, a WiFi module 223, a BT module 225, a GNSS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function. Each of the WiFi module 223, the BT module 225, the GNSS module 227 and the NFC module 228 may include a processor for processing data transmitted or received therethrough. Although FIG. 2 shows the cellular module 221, the WiFi module 223, the BT module 225, the GNSS module 227 and the NFC module 228 as different blocks, at least part of them may be contained in a single IC (Integrated Circuit) chip or a single IC package in an embodiment.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Although FIG. 2 shows that the cellular module 221, the WiFi module 223, the BT module 225, the GNSS module 227 and the NFC module 228 share the RF module 229, at least one of them may perform transmission and reception of RF signals through a separate RF module in an embodiment.

The SIM card 224 may include, for example, an embedded SIM and/or a card including a user identification module, and may include unique identification information (e.g., an integrated circuit card identifier (ICCID)) or subscriber information (e.g., international mobile subscriber identity (IMSI)).

The memory 230 may include an internal memory 232 and an external memory 234. The memory 230 may be, for example, the memory 130 illustrated in FIG. 1. The internal memory 232 may include, for example, at least one of a volatile memory (e.g., a Dynamic RAM (DRAM), a Static RAM (SRAM), a Synchronous Dynamic RAM (SDRAM), etc.), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, etc.). According to an embodiment of the present disclosure, the internal memory 232 may be in the form of a Solid State Drive (SSD). The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a memory stick, or the like. The external memory 234 may be functionally connected to the electronic device 201 through various interfaces.

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric (e.g., barometer or barometric) sensor 240C, a magnetic sensor 240D, an acceleration sensor 240E, a grip sensor 240F, a proximity sensor 240G, a color sensor 240H (e.g., RGB or "Red, Green, Blue" sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. The touch panel 252 may further include a tactile layer. In this case, the touch panel 252 may offer a tactile feedback to a user. The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data.

The display 260 (e.g., the display 160) may include a panel 262, a hologram 264, or a projector 266. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 170 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least part of the audio module 280 may be contained, for example, in the input/output interface 150 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 201. Although not shown, the power management module 295 may include, for example, a PMIC (Power Management Integrated Circuit), a charger IC, or a battery or fuel gauge. The PMIC may be mounted to, for example, an IC or a SoC semiconductor. Charging methods may be classified into a wired charging method and a wireless charging method. A wireless charging type may include, for example, a magnetic resonance type, a magnetic induction type, or an electromagnetic type. Any additional circuit for a wireless charging may be further used such as a coil loop, a resonance circuit, or a rectifier. The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

Figure 3:
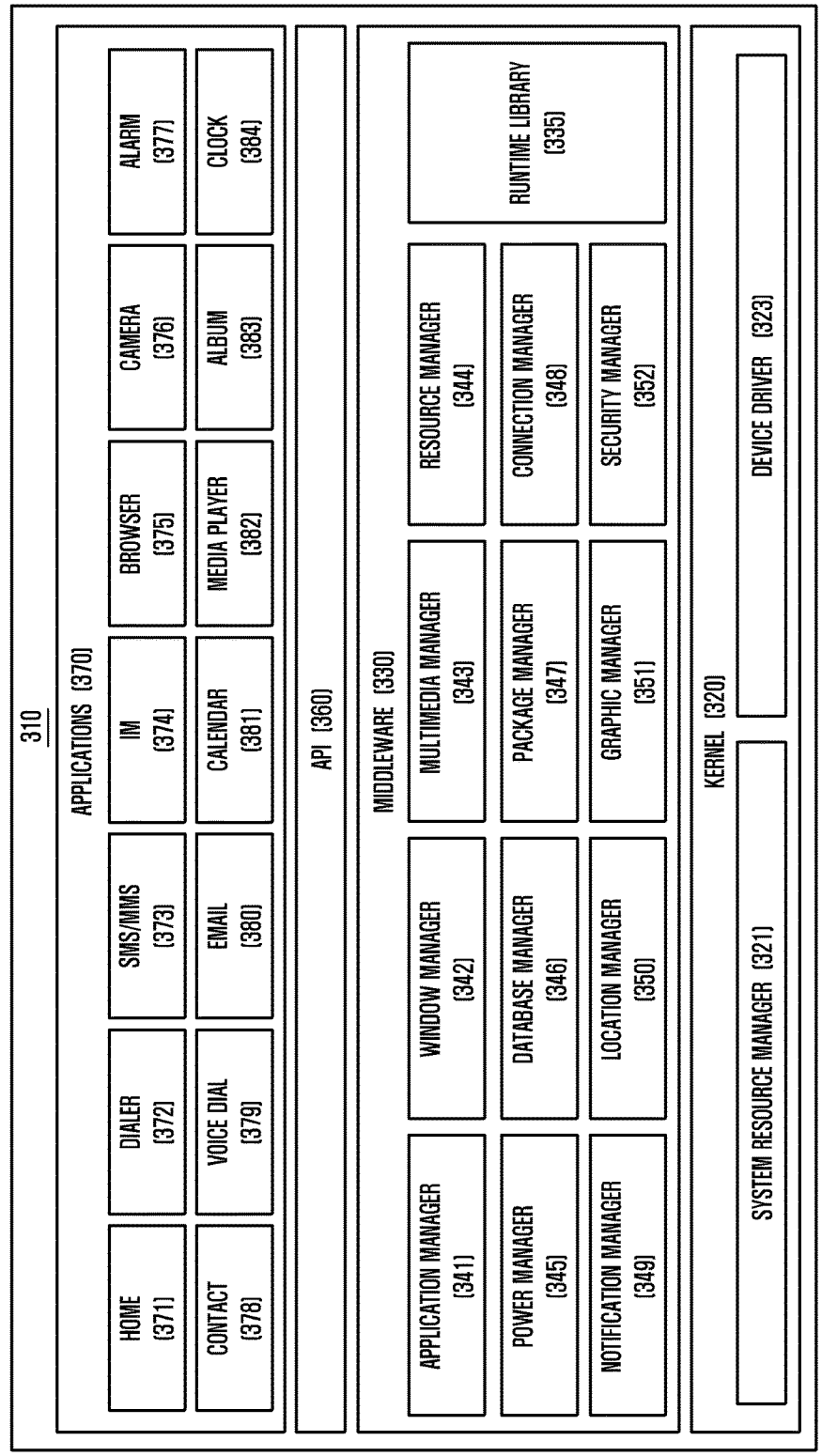
FIG. 3 is a block diagram of a program module according to various embodiments of the present disclosure.

FIG. 3 is a block diagram illustrating a program module according to an embodiment of the present disclosure.

Referring to FIG. 2, a program module 310 (e.g., the program 140) may include an operating system (OS) controlling resources related to the electronic device (e.g., the electronic device 101) and/or various applications (e.g., the application 147) that are driven on the operating system. The operating system may include, e.g., Android™, iOS™ Windows™, Symbian™, Tizen™, or Bada™.

The program module 310 may include, e.g., a kernel 320, middleware 330, an API 360, and/or an application 370. At least a part of the program module 310 may be preloaded on the electronic device or may be downloaded from any external electronic device (e.g., the electronic device 104 of the server 106).

The kernel 320 (e.g., the kernel 141 of FIG. 1) may include, e.g., a system resource manager 321 and/or a device driver 323. The system resource manager 321 may perform control, allocation, or recovery of system resources and may include a process managing unit, a memory managing unit, and/or a file system managing unit. The device driver 323 may include, e.g., a display driver, a camera driver, a BT driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly implemented by applications 370. The middleware 330 (e.g., middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

The runtime library 335 may include a library module used by a compiler to add a new function through a programming language while, e.g., the application 370 is being executed. The runtime library 335 may perform input/output management, memory management, and/or arithmetic functions.

The application manager 341 may manage the life cycle of at least one application of, e.g., the applications 370. The window manager 342 may manage graphical user interface (GUI) resources used on the screen. The multimedia manager 343 may determine formats utilized to play various media files and use a codec appropriate for a format to perform encoding or decoding on media files. The resource manager 344 may manage resources, such as source code of at least one of the applications 370, memory and/or storage space.

The power manager 345 may operate together with, e.g., a basic input/output system (BIOS) to manage battery or power and provide power information utilized for operating the electronic device. The database manager 346 may generate, search, and/or query a database to be used in at least one of the applications 370. The package manager 347 may manage installation or update of an application that is distributed in the form of a package file.

The connectivity manager 348 may manage wireless connectivity, such as, e.g., Wi-Fi or BT. The notification manager 349 may display or notify an event, such as a coming message, appointment, and/or proximity notification without interfering with the user. The location manager 350 may manage locational information on the electronic device. The graphic manager 351 may manage graphic effects to be offered to the user and their related user interface. The security manager 352 may provide various security functions utilized for system security and/or user authentication. When the electronic device (e.g., the electronic device 101) has telephony capability, the middleware 330 may further include a telephony manager for managing voice call and/or video call functions of the electronic device. The middleware 330 may include various functions of the above-described components. The middleware 330 may provide a specified module per type of the operating system to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application processor 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar) (not shown), and/or environmental information (e.g., provision of air pressure, moisture, or temperature information) (not shown). The application 370 may include information exchanging application supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device. For example, a notification relay application may include a function for relaying notification information generated from other applications of the electronic device (e.g., the SMS/MMS application, the email application, the health-care application, or the environmental information application) to the external electronic device (e.g., the electronic devices 102 and 104). Further, the notification relay application may receive notification information from, e.g., the external electronic device and may provide the received notification information to the user. A device management application may perform at least some functions of the external electronic device (e.g., the electronic device 102 or 104) such as, for example, turning on/off the external electronic device (or some components of the external electronic device), control brightness (or resolution) of the display, etc. The device management application may manage (e.g., install, delete, or update) an application operating in the external electronic device or a service (e.g., call service or message service) provided from the external electronic device.

The application 370 may include an application (e.g., a health-care application) selected depending on the attribute (e.g., as an attribute of the electronic device, the type of electronic device is a mobile medical device) of the external electronic device (e.g., the electronic devices 102 and 104). The application 370 may include an application received from the external electronic device (e.g., the server 106 or electronic devices 102 and 104). The application 370 may include a preloaded application or a third party application downloadable from a server. The names of the components of the program module 310 according to the shown embodiment may be varied depending on the type of operating system. At least a part of the program module 310 may be implemented in software, firmware, hardware, or in a combination of two or more thereof. At least a part of the programming module 310 may be implemented (e.g., executed) by e.g., a processor (e.g., the AP 210). At least a part of the program module 310 may include e.g., a module, a program, a routine, a set of instructions, a process, or the like for performing one or more functions.

Figure 4:
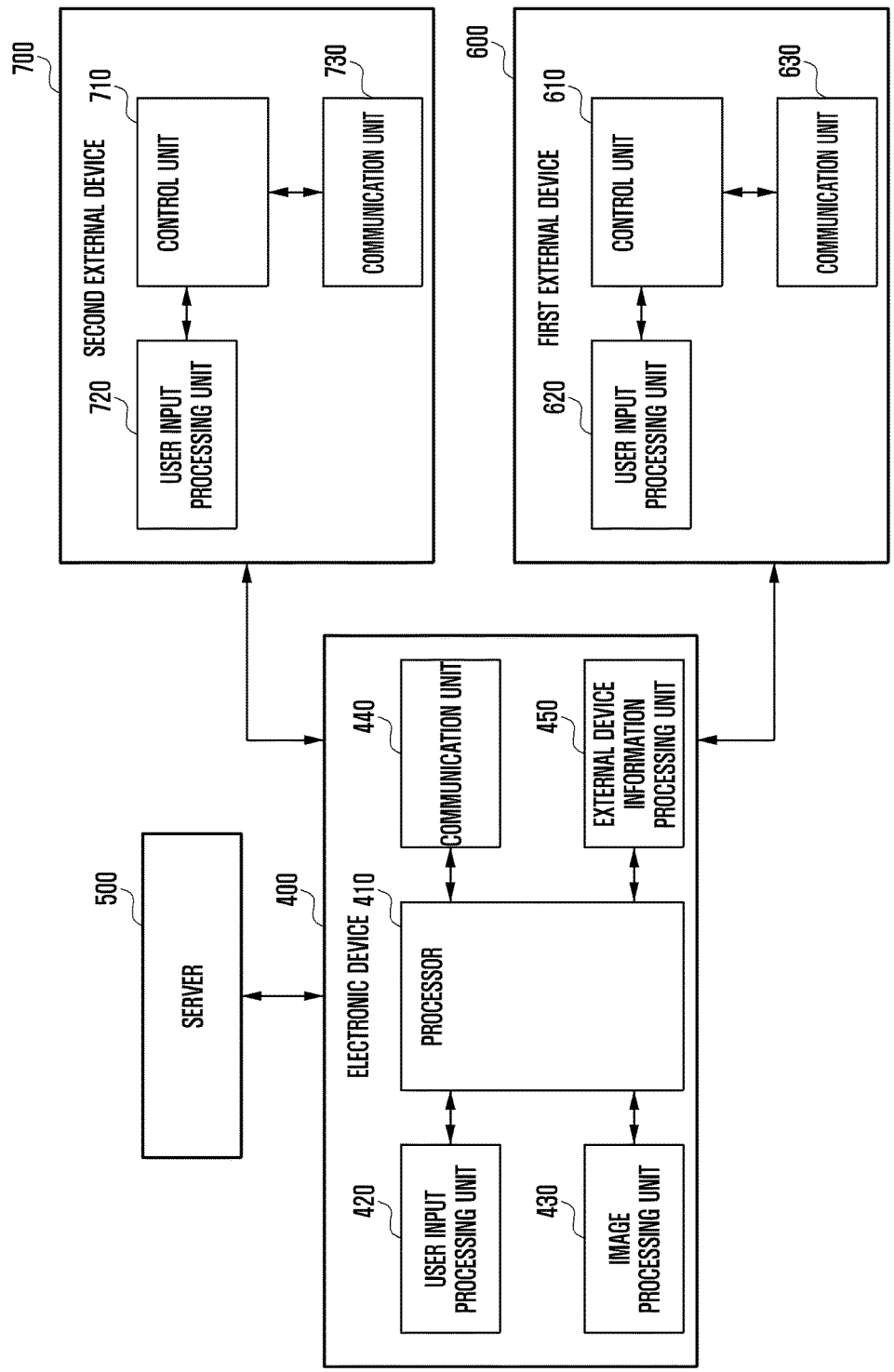
FIG. 4 is a diagram illustrating connection of an electronic device according to various embodiments of the present.

FIG. 4 is a diagram illustrating connection of an electronic device 400 according to various embodiments of the present disclosure. The electronic device 400 may be in communication with a server 500, a first external device 600, and a second external device 700. Here, the electronic device 400, the first external device 600, and the second external device 700 may be one of the electronic device 101, the electronic device 102, and the electronic device 104 as illustrated in FIG. 1. Here, the server 500 may be the server 106 as illustrated in FIG. 1, and may be a part of the electronic device 400.

The electronic device 400 according to an embodiment of the present disclosure may include a processor 410, a user input processing unit 420, an image processing unit 430, a communication unit 440, and an external device information processing unit 450. The constituent elements of the electronic device 400 may be added or omitted. For example, the electronic device 400 may further include a sensor module (e.g., acceleration sensor, gyro sensor, geomagnetic sensor, and proximity sensor).

The electronic device 400 according to an embodiment of the present disclosure may be a wearable device. For example, the wearable device may at least one of an accessory type (e.g., watch, glasses, or contact lens) device and a Head-Mounted Device (HMD).

The electronic device 400 according to an embodiment of the present disclosure may be a device that comes in contact with or is mounted on both eyes of a user to display an image. The electronic device 400 according to an embodiment may provide at least one of a "see-through" function for providing Augmented Reality (AR) and a vision-enclosed function for providing Virtual Reality (VR). The "see-through" function may mean a function of providing additional information or image as one image in real time while transferring actual external images to user's eyeballs through a display for the AR display. The vision-enclosed function may mean a function of providing content provided through a display as an image for a VR display.

The processor 410 according to an embodiment of the present disclosure may be connected to the server 500, the first external device 600, and the second external device 700 through the communication unit 440. The processor 410 according to an embodiment may receive an input signal for activating a virtual region from the external devices 600 and 700. For example, the external devices 600 and 700 may transfer an activation signal to the electronic device 400 if a user input event for activating the virtual region is detected, or if a predetermined reference (e.g., connection establishment of the external devices 600 and 700 to the electronic device 400) is satisfied.

The processor 410 according to an embodiment of the present disclosure may receive application-related information from at least one external device. The processor 410 according to an embodiment of the present disclosure may receive the application related information from the first external device 600 through the communication unit 440.

The application according to an embodiment may include at least one of an application that is currently being displayed on the external devices 600 and 700, an initial screen, a currently executed application list, an application pre-designated by a user, and an application providing a specific function.

The processor 410 according to an embodiment of the present disclosure may determine the display characteristics of an application that is received from the external devices 600 and 700 through the external device information processing unit 450. Here, the display characteristics may be location information (e.g., absolute location information or relative location information) of a virtual object to be displayed based on the application or depth information of a space/object (hereinafter referred to as "depth information"). Further, the display characteristics may be conditions for determining the display of the received application. For example, if an alarm application, an SNS application, or a photographing application is received, the electronic device 400 may display the virtual object based on the corresponding application.

The processor 410 according to an embodiment of the present disclosure may receive information (e.g., unique ID information, user account information, current status information of an application, and cloud information) for the electronic device 400 to execute application information that is received from the external devices 600 and 700. The processor 410 may operate to display the virtual object based on the received information.

The processor 410 according to an embodiment may transfer information indicating that the virtual object is being displayed to the external devices 600 and 700.

Interoperation between the electronic device 400 according to an embodiment of the present disclosure and the external devices 600 and 700 may differ in accordance with the application, user preference, performances of the external devices 600 and 700 and the electronic device 400, and information related to cloud sharing.

The processor 410 according to an embodiment of the present disclosure may recognize a shape of an external physical screen for displaying the application of at least one external device. The processor 410 according to an embodiment may recognize the shape of the external physical screen of the second external device 700 through the image processing unit 430. For example, the processor 410 may recognize a hardware boundary surface of the screen on which a program of the second external device 700 is displayed through the image processing unit 430.

The image processing unit 430 according to an embodiment of the present disclosure may receive an image from at least one camera. The received image may be a 2-Dimensional (2D) image, or a 3D image including depth information. The image processing unit 430 according to an embodiment may recognize the screen of the second external device 700 using a high-resolution camera, a stereo camera, or an IR camera.

The image processing unit 430 according to an embodiment of the present disclosure may recognize an image object within an image through analysis of image information included in the received image. The image processing unit 430 according to an embodiment may recognize the kind and attribute of the image object through a camera module. For example, the image processing unit 430 may discriminate the object that is recognized through the camera as the electronic device, a human finger, or a human wrist.

The image processing unit 430 according to an embodiment of the present disclosure may recognize a boundary of an image object and human skeleton through the camera module. For example, the image processing unit 430 may recognize the outline boundary of the screen of the external electronic device and user's finger joint locations that are recognized through the camera module. As an additional example, the image processing unit 430 may detect an eye direction of the user of the electronic device 400 and a concerned area according to the eye.

The electronic device 400 according to an embodiment may track the user's eye through an eye tracker (not illustrated) mounted on one side of the electronic device 400, for example, using at least one of Electrical OculoGraphy (EOG), coil systems, dual "Purkinje" systems, bright pupil systems, and dark pupil systems. Further, the eye tracker may further include a micro camera for eye tracking. Adjustable optics (not illustrated) mounted on one side of the electronic device 400 according to an embodiment may control a lens distance and a display location through measurement of user's Inter-Pupil Distance (IPD) so that the user can enjoy an image that is suitable to the user's eyesight.

The processor 410 according to an embodiment of the present disclosure may display a virtual object based on the received application related information on one region that is determined on the basis of the recognized external shape of the screen. The processor 410 according to an embodiment may operate to display an output image that is generated through the image processing unit 430 on the virtual region that is within a predetermined distance from the recognized external shape of the screen as the virtual object.

The image processing unit 430 according to an embodiment of the present disclosure may generate a virtual image based on 3D spatial information and user's motion information. The image processing unit 430 according to an embodiment may synthesize a plurality of images with the virtual image to generate a final output image. The 3D spatial information may include screen information (e.g., size information and resolution information) of the external devices (e.g., first external device 600 and second external device 700). The image processing unit 430 according to an additional embodiment may perform motion detection of the electronic device 400, eye detection of the user of the electronic device 400, and image rendering. If the electronic device 400 is a wearable device, the image processing unit 430 according to an embodiment may differently display the screen that is displayed on user's both eyes.

The one region that is determined on the basis of the recognized external shape of the screen according to an embodiment may be a virtual region that is within a predetermined distance from a physical boundary region of the screen for displaying an application of at least one external device. For example, if the second external device 700 has a screen of 23 inches (495.36 mm (in width)×309.60 mm (in length)), the processor 410 may display a virtual extended screen of 40 inches (906 mm (in width)×609 mm (in length)), and may display an application related virtual object on one region of the virtual extended screen.

The processor 410 according to an embodiment of the present disclosure may display the virtual object based on at least one of size information of the screen and screen information (e.g., resolution information) of the screen that are recognized through the image processing unit 430. The processor 410 according to an embodiment may display the virtual object based on a pre-stored condition, content information currently output through the second external device 700, and text information.

The processor 410 according to an embodiment of the present disclosure may recognize the external devices (e.g., 600 and 700) and may determine on what region of the virtual extended screen to arrange them. The processor 410 according to an embodiment may determine a region on which the virtual object is to be displayed, resolution information, color information, and brightness information based on eye information and motion information of the user of the electronic device 400.

If a user input is received, the processor 410 according to an embodiment of the present disclosure may perform an application based on the received user input. The processor 410 according to an embodiment may transfer the performed application to the external devices (e.g., first external device 600 and second external device 700).

The electronic device 400 according to an embodiment of the present disclosure may change a graphic user interface of the virtual object that is being displayed or to be displayed on the basis of a control signal received from the external devices 600 and 700. For example, if a control input signal (e.g., touch input event) is received from the first external device 600, the electronic device 400 may change the graphic user interface of the virtual object. As an additional example, the electronic device 400 may transfer a related signal to the second external device 700 when changing the virtual object.

The processor 410 according to an embodiment of the present disclosure may display the virtual object based on an application that is being executed on a background of at least one external device through the image processing unit 430. The processor 410 according to an embodiment may display the virtual object based on the application that is being executed on the background of the first external device 600 through the image processing unit 430.

Even if one application is executed on the background of the first external device 600, the processor 410 according to an embodiment of the present disclosure may receive the corresponding application information from the first external device 600. The processor 410 according to an embodiment may display the virtual object based on the received application information.

If the external devices 600 and 700 intend to display the second application while the virtual object is being displayed on the basis of the received application information, the processor 410 according to an embodiment of the present disclosure may receive the second application from the external devices 600 and 700. The processor 410 may display both the application and the second application or may selectively display one application only.

The external devices 600 and 700 according to an embodiment of the present disclosure may perform multi-tasking with respect to the application and the second application. For example, while the processor 410 displays the virtual object based on the received application, the external devices 600 and 700 may operate not to terminate the application.

The external device information processing unit 450 of the electronic device according to an embodiment of the present disclosure may determine the received display characteristics of the second application. Here, the display characteristics may be location information (e.g., absolute location information, relative location information, size information, and depth information). As an additional example, the processor 410 may control the virtual objects that are based on the application and the second application to be displayed side by side on the virtual region with the same depth information. As still another example, the processor 410 may control the virtual objects that are based on the application and the second application to be hierarchically displayed on the virtual region with different depth information.

If an update signal according to the change of application related information is received from at least one external device, the processor 410 according to an embodiment of the present disclosure may update the displayed virtual object based on the received change signal. If a new event (e.g., message reception) occurs in the first external device 600, the processor 410 according to an embodiment may update the graphic user interface of the virtual object being displayed. For example, the electronic device 400 may change the arrangement of the graphic user interface of the virtual object or may display a notification item according to the application change of the first external device 600 on the virtual region.

The processor 410 according to an embodiment of the present disclosure may update the displayed virtual object through an input device of the at least one external device. The processor 410 according to an embodiment may update (e.g., size enlargement or size reduction) the virtual object being displayed through gesture input of the user of the electronic device 400 or an input device (e.g., mouse) of the second external device 700. The processor 410 according to an embodiment may operate to display the virtual object on the screen of the second external device 700 through the gesture input or movement input event (e.g., drag and drop or touch swipe) by the input device (e.g., mouse or touch screen) of the external devices 600 and 700.

The processor 410 according to an embodiment of the present disclosure may display the virtual object based on the application information included in the first external device 600 through the image processing unit 430. The processor 410 according to an embodiment may sense an input event for an image item that is included in the virtual object through the input device of the second external device 700 including the screen.

The processor 410 according to an embodiment of the present disclosure may transmit a related signal to the second external device 700 through the communication unit 440 so as to display an application corresponding to the image item on the screen of the second external device 700 based on the sensed input event. The processor 410 according to an embodiment may sense the input event (e.g., drag and drop input event or click input event) by the input device (e.g., mouse) of the second external device for the virtual object being displayed.

The processor 410 according to an embodiment of the present disclosure may determine whether the application is executable in the second external device 700. If it is determined that the application is executable in the second external device 700, the processor 410 according to an embodiment may transmit the corresponding application (e.g., document file or attached file related application) from the first external device 600 to the second external device 700. The second external device 700 may execute the application based on the received application. For example, in the case where the second external device 700 displays the corresponding application, the processor 410 may operate to convert the virtual object that is being displayed in 3D into 2D virtual object and to display the 2D virtual object on the screen of the second external device 700.

The processor 410 according to an embodiment of the present disclosure may receive image information of the application corresponding to the virtual object for which the input event is sensed from the first external device 600 through the communication unit 440. The processor 410 according to an embodiment may convert the received image information into a virtual object to display the converted virtual object.

If an input event for moving an item displayed on the screen of the second external device 700 to the virtual object through the communication unit 440 is sensed, the processor 410 according to an embodiment of the present disclosure may transmit the related signal to the first external device 600. For example, if an e-mail is received from the first external device 600 and the attached file is an office file, the processor 410 may transmit the related signal to the first external device 600 so that the second external device 700 having a screen that is larger than the screen of the first external device 600 can directly perform tasks. As an additional example, the processor 410 may edit a document through the screen of the second external device 700, and if the edited document file is dropped to the virtual event displayed using the movement input event (e.g., drag event), the processor 410 may operate to attach the corresponding file to the virtual object to be transmitted.

The processor 410 according to an embodiment of the present disclosure may display a virtual screen having an extended size against the recognized screen size on the virtual region through the image processing unit 430. The processor 410 according to an embodiment may display a virtual extended screen which is in parallel to the screen of the second external device 700 and which has a size that is larger than the size of the screen through the image processing unit 430. The size of the virtual extended screen may be designated by a user, and the virtual extended screen may be displayed on the basis of the resolution and the physical size of the display that can be displayed by the screen of the second external device 700.

The processor 410 according to an embodiment of the present disclosure may display the virtual extended screen on one region excluding the screens of the external devices 600 and 700. For example, the processor 410 can display a plurality of layered screens having different depth information.

The processor 410 according to an embodiment of the present disclosure may arrange the virtual extended screen based on the real object (e.g., actual object). For example, an actual object (e.g., cup) may exist in the neighborhood of the screen of the second external device 700, and a virtual object may be arranged around the actual object. In this case, if the actual object (e.g., cup) moves, the corresponding virtual object may correspondingly move. The processor 410 according to an embodiment may use the location of the actual object (e.g., beverage bottle, pencil, or cup) as a reference of virtual coordinates for displaying the virtual object, and may operate to move and display the virtual object independently of the actual object after being displayed.

The processor 410 according to an embodiment of the present disclosure may display a hologram image through the virtual extended screen. For example, when the virtual object having 3D information is displayed on the virtual extended screen, the processor 410 may display the corresponding object in the form of a hologram. When a specific application having a 3D interface moves to the extended screen to be displayed thereon, the processor 410 according to an embodiment may operate to display the corresponding application in a 3D mode using this.

If the input device (e.g., mouse) of the second external device 700 that is being displayed on the screen of the second external device 700 exceeds the physical boundary of the screen, the processor 410 according to an embodiment of the present disclosure may be converted into a mouse cursor of the virtual object.

If there exists a window of a 3D space when an input, in which the input device (e.g., mouse) of the second external device 700 exceeds the physical boundary of the screen, is received from the screen of the second external device 700, the processor 410 according to an embodiment of the present disclosure may be converted into a control of the 3D space.

When the processor 410 according to an embodiment of the present disclosure uses the virtual extended screen, user input for the electronic device 400 and the external devices 600 and 700 may also interoperate with the virtual extended screen. For example, when a user uses a controller, such as the existing keyboard or mouse, on a PC, it may be possible to enter an input for the object that is disposed on the virtual extended screen outside of the screen of the PC through a mouse point or a cursor.

As an additional example, if a mouse cursor is moved beyond the existing image display region of one screen that has been controlled by a user, the object that is located on the virtual extended screen may be controlled through switching of a mode of the existing input tool that has been used. In the case of the virtual extended screen that includes display regions beyond the one existing screen of a physical display, a multi-dimensional virtual screen becomes possible, and the operation mode of the user input tool may be changed from 2D to 3D to perform operations on such a screen.

In an embodiment of the present disclosure, the mode may be switched when a user request is input or entering into the virtual extended screen is recognized. A user may switch the mode of the input tool through execution of an icon or application that is on the screen of the device. The mode of the virtual extended screen according to an embodiment may be switched when the electronic device 400 and the external devices 600 and 700 recognize that the pointer or the cursor moves to a region that deviates from the existing screen. The recognition of the pointer or the cursor may be performed through visual recognition of the electronic device 400, recognition by a sensor device that is located on an outside, such as an external camera, or recognition by information transfer through a radio wave technique, such as short-range communication.

Once the mode switching is performed, the user of the electronic device 400 may control the extended screen (3D space) using the existing input device (e.g., means). This may be a method that enables a button or an additional input device to be operable on a mouse or a keyboard. In an embodiment, the operation on the virtual extended screen may correspond to a control related function and a screen updating function and may be exchangeable between two devices.

For example, if an object to be controlled is located on the virtual extended screen of a PC or a tablet PC, the object can be controlled using a motion control or voice control provided on a Head-Mounted Display (HMD).

In an embodiment, switching from 2D mode to 3D mode or switching from 3D mode to 2D mode may be performed when the user request is input or entering into the virtual extended screen is recognized. The electronic device 400 may sense a user's input for selecting an input tool of a device through execution of an icon or application on the device screen. According to the virtual extended screen according to an embodiment, the input tool may be switched when a HMD, a mobile, or a device, such as a PC, recognizes that the pointer or the cursor moves to a region that deviates from the existing screen. The recognition of the pointer or the cursor may be performed through visual recognition of the HMD, recognition by a sensor device that is located on an outside, such as an external camera, or recognition by information transfer through a radio wave technique, such as short-range communication.

After the mode switching according to an embodiment is performed, the user of the electronic device 400 may control the virtual object using input device (e.g., means) of the second devices (e.g., external devices 600 and 700). For example, after the control through the keyboard or the mouse is changed, the control may be input through voice input or gesture input of the electronic device (e.g., the HMD electronic device 400). In this case, control related and screen update information may be exchangeable between two devices.

The electronic device 400 according to an embodiment of the present disclosure may control one or more applications being executed through transfer of recognized user gesture information to the first external device 600.

In the case of displaying two or more applications having depth information, the electronic device 400 according to an embodiment of the present disclosure may select a certain application through determination of the depth information for the user input.

In the case of displaying two or more applications having depth information, the electronic device 400 according to an embodiment of the present disclosure may change the displayed depth information of the respective applications through determination of the depth information for the user input.

In the case where one or more applications are displayed, the electronic device 400 according to an embodiment of the present disclosure may control the performance of the application of the second external device 700 using the user gesture information that is recognized through the electronic device 400.

In the case of recognizing a user specific gesture, the electronic device 400 according to an embodiment of the present disclosure may newly perform applications of the external devices 600 and 700. If a specific gesture is recognized, the electronic device 400 according to an embodiment may change the application that is performed on a background to a foreground.

The processor 410 according to an embodiment of the present disclosure may display a plurality of virtual regions having different depth information through the image processing unit 430.

The virtual objects including the respective virtual regions according to an embodiment of the present disclosure may be displayed on the basis of at least one of the kind of the application corresponding to the virtual object to be displayed and predetermined virtual object arrangement information.

The user input processing unit 420 according to an embodiment of the present disclosure may recognize the gesture of the user of the electronic device 400, and then may transfer information corresponding to the recognized gesture to the processor 410. The user input processing unit 420 according to an embodiment may recognize the gesture and user eye input.

The communication unit 440 according to an embodiment of the present disclosure may transmit/receive information (e.g., output information of the external devices 600 and 700, user input related information, and application information) with the external devices 600 and 700.

The external device information processing unit 450 according to an embodiment of the present disclosure may process output information (e.g., image information, voice information, and vibration feedback information) of the external devices 600 and 700 connected to the electronic device 400. For example, in the case of receiving sound information from the external devices 600 and 700, the external device information processing unit 450 may reproduce audio that corresponds to the received sound information. As an additional example, the external device information processing unit 450 may arrange the image information (e.g., attributes, such as spatial coordinates and direction) among the output information of the external devices 600 and 700. The external device information processing unit 450 may perform sound rendering based on the arranged image information.

The electronic device 400 according to an embodiment of the present disclosure may display an application that is being executed in the second external device 700 or a window on the virtual region. The electronic device 400 according to an embodiment may perform the control of the application being executed in the second external device 700 or the window through the gesture input of the user of the electronic device 400. The electronic device 400 according to an embodiment may perform the control of the application being executed in the second external device 700 or the window through sharing of I/O information (e.g., location information of a mouse cursor) from the second external device 700 and displaying of the mouse pointer or the cursor on the virtual region.

The electronic device 400 according to an embodiment of the present disclosure may have and display the depth information of the application of the second external device 700 or the window. For example, the electronic device 400 may display the latest updated application or window on the virtual region in the closest distance from the electronic device 400 in comparison to other applications.

In the case of dragging a document being executed in the second external device 700 with a mouse to move the document out of the screen boundary region of the second external device 700, the electronic device 400 according to an embodiment of the present disclosure may convert the corresponding document into a virtual object and may display the converted virtual object at a moment when the document gets out of the screen boundary region of the second external device 700. The electronic device 400 may fix and display the generated document virtual object on a drop region.

The server 500 according to an embodiment of the present disclosure may include a part of modules of the electronic device 400. The server 500 according to an embodiment may transmit/receive data with the device including the electronic device 400.

The first external device 600 according to an embodiment of the present disclosure may include a control unit 610, a user input processing unit 620, and a communication unit 630. The first external device 600 according to an embodiment may be a mobile terminal.

If a user input (e.g., touch input) that is sensed in the first external device 600 is sensed, the user input processing unit 620 of the first external device 600 according to an embodiment may transfer a signal corresponding to the sensed user input to the control unit 610.

The control unit 610 of the first external device 600 according to an embodiment may perform connection with the electronic device 400 and the second external device 700 through the communication unit 630.

The second external device 700 according to an embodiment of the present disclosure may include a control unit 710, a user input processing unit 720, and a communication unit 730. The second external device 700 may be a device including a screen having a constant size.

If a user input (e.g., keyboard input or mouse input) that is sensed in the second external device is sensed, the user input processing unit 720 of the second external device 700 according to an embodiment may transfer a signal corresponding to the sensed user input to the control unit 710.

The control unit 710 of the second external device 700 according to an embodiment may perform connection with the electronic device 400 and the second external device 700 through the communication unit 730.

The electronic device 400 according to an embodiment of the present disclosure may display a virtual object. Here, the virtual object may mean an object which is rendered by the electronic device 400 and is seen by a user of the electronic device 400. For example, in the case where the electronic device 400 generates a virtual screen and shows movie content on the corresponding screen, the generated screen may be the virtual object. Unlike the virtual object, a real object may mean an object that exists in actual reality. For example, in consideration of an environment such as a room, furniture, such as a desk, a chair, and a bookshelf, and home appliances, such as a TV and an audio device, may be real objects.

The electronic device 400 according to an embodiment of the present disclosure may show both real objects and virtual objects. The electronic device 400 according to an embodiment may display the virtual object that overlaps the real object.

The electronic device 400 can provide various functions including Augmented Reality (AR) function. When the AR function is performed, the real object and the virtual object may have various correlations with each other. In an embodiment, the virtual object may fall under the same physical law as that of the real object in the same space as that of the real object, and may exist like one real object. For example, if there are a sofa and a virtual table arranged in front of the sofa in a room, the virtual object table differs like an actual table depending on the user's location through rendering of the scale thereof as the sofa portion that is seen by the user differs depending on the location of the user of the electronic device 400.

The electronic device 400 according to an embodiment of the present disclosure may display the virtual object and the real object in an overlapping manner. For example, if the electronic device 400 is see-through glasses, the electronic device 400 may operate to locate a virtual screen at a right upper end, and when separate media content is reproduced, the electronic device 400 displays a corresponding object so that it overlaps the corresponding virtual screen regardless of whether the actual object comes into view.

The virtual object and the real object according to an embodiment of the present disclosure may have specific correlations. For example, in the case where a table that is a real object and a table related information window that is a virtual object exist, the table related information that is the virtual object may display additional information, such as the price of the table and a brand size. According to an additional embodiment, the virtual object may be displayed in consideration of mutual locations of the table and the corresponding information window so that the table and the information window do not overlap each other from the user's eyes.

For example, the user may enter into a room with the electronic device 400 mounted on the user. In this case, a table, a window, a lamp, and a door, which are real objects, may be displayed, and virtual objects may also be displayed together with the real objects. For example, the virtual object may be the face of the calling opposite party of another device that is connected to the electronic device 400 through communication.

The virtual object according to an embodiment of the present disclosure may render an image to be transferred to another electronic device based on the user's location information or eye information that is received from the other electronic device.

A part of the virtual objects according to an embodiment of the present disclosure may be displayed based on the location information or eye information of the user of the electronic device 400. A part of the virtual objects according to an embodiment may include attributes, such as object location, size, rotating angle, slope, and color. For example, an indexing information object that is displayed on an upper side of a bookshelf on the virtual region may have changed rotating angle and slope attribute based on the eye information of the user of the electronic device 400 and may be displayed to see the same plane regardless of the location and the angle, through which the user sees the indexing information object. The location information of the indexing information object may have a constant value in the virtual region regardless of the user's location information or eye information.

The part of the virtual objects according to an embodiment of the present disclosure may be displayed regardless of the location information or eye information of the user of the electronic device 400. The virtual objects that are not affected by the user's location or eye information may be virtual objects included in the virtual space or real objects.

The virtual object that is not affected by the location or eye information according to an embodiment may be information that is generated by another electronic device (e.g., client terminal or external server) and is provided to the user. The image object according to an embodiment may be processed independently of a 3D rendering unit that operated in a virtual space server. For example, the image information that is rendered by the 3D rendering unit may be received in the client terminal and then the image object that is generated by the client terminal may be mixed with the rendered image information to be displayed.

The electronic device 400 according to an embodiment of the present disclosure may recognize the surrounding environment of the user of the electronic device 400 using the electronic device 400 or another device connected to the electronic device 400. Here, the environment information may include video information and object distance information that can be acquired through a camera (e.g., depth camera or Infrared (IR) camera).

The electronic device 400 according to an embodiment of the present disclosure may recognize radio wave information around the user through wireless communication technology. The radio wave information may include location information role information of devices in the neighborhood of the electronic device 400. For example, the location information may be acquired through GPS or indoor localization technology.

The electronic device 400 according to an embodiment of the present disclosure may recognize and analyze objects around the user of the electronic device 400 on the basis of environmental information that is obtained through sensors or information exchange with other devices. The analysis of the electronic device 400 according to an embodiment can be independently performed by the electronic device 400 or can be performed through sharing of operation or data with another electronic device (e.g., server).

The electronic device 400 according to an embodiment of the present disclosure may recognize feature information of the real object around the user of the electronic device 400, for example, physical and electronic additional information, such as location, use purpose, model name, constituent material, shape, color, existence/nonexistence of a short-range communication module, and radio wave strength.

The electronic device 400 according to an embodiment of the present disclosure may form correlations between the real object and the virtual object or a specific function of the electronic device 400 based on the feature information of the real object. For example, in the case of mapping a pencil that is a real object located on the disk on a memo application window that is a virtual object, the electronic device 400 may grasp the characteristics (e.g., color, shape, and length) of the pencil, connect the memo application window to the corresponding pencil through this, and move the memo window that is the virtual object along the movement of the pencil if the pencil moves.

The electronic device 400 according to an embodiment of the present disclosure may scan the real object and grasp the purpose of the real object. The electronic device 400 according to an embodiment may arrange the virtual object on the surface of the real object or on a location in the neighborhood of the real object based on the purpose of the real object. For example, the virtual object according to an embodiment may recognize the user input through recognition of a user touch, click, or eye of the user of the electronic device 400. The electronic device 400 may control the function of the electronic device 400 or the function of another device connected to the electronic device 400 through the recognized user input. In this case, the arrangement of virtual object icons may be designated by the user, or the initial position thereof may be designated by the electronic device 400.

The electronic device 400 according to an embodiment of the present disclosure may scan the room of the user of the electronic device 400, and then recognize that bookshelf, TV, audio, and table are located around the user of the electronic device 400 through the image information. After the recognition, the electronic device 400 according to an embodiment may recognize the purpose of the bookshelf among the real objects is to take custody of books, and may display an E-book related interface or E-book icon on or around the bookshelf. The electronic device according to an additional embodiment may arrange a virtual object related to a table game or a game trophy on the table, or may arrange a media related virtual object, such as volume control, beside the audio.

The electronic device 400 according to an embodiment of the present disclosure may receive a radio wave signal of a surrounding environment. The electronic device 400 according to an embodiment of the present disclosure may recognize the user surrounding environment through a sensor that recognizes a radio wave signal in addition to a visual sensor. The electronic device 400 according to an embodiment may recognize the location of another electronic device based on the radio wave signal. The electronic device 400 may arrange the virtual object in relation to another recognized electronic device in a location that is adjacent to the corresponding device.

For example, if there is a network device that performs a short-range communication module, such as Bluetooth, the virtual object may be arranged based on the location information and content information obtained through communication between the corresponding device and the electronic device 400. The electronic device 400 may display the virtual object that provides a function of adjusting a volume of an audio device on the audio device or in a space adjacent to the audio device based on the setting information and location information of the audio device through the short-range communication (e.g., Bluetooth).

The electronic device 400 according to an embodiment of the present disclosure may display the virtual object on the virtual region. The electronic device 400 according to an embodiment of the present disclosure may arrange the virtual object through interlocking of acquired sensing information and the real object based on the information acquired using the sensor of the electronic device 400. For example, the electronic device 400 may arrange the virtual object that performs a memorandum or alarm function in a space which the user's eyes are mostly turned upon in the specific space through collection of the eye information of the user of the electronic device 400. As an additional example, the virtual object may be rearranged or may be differently viewed to match the corresponding place or time through scanning of time information or place information by the sensor of the electronic device 400.

The electronic device 400 according to an embodiment of the present disclosure may arrange the virtual object through mixing of the sensing information that is acquired from the sensor of the electronic device 400 and characteristic information of the real object. For example, the electronic device 400 may grasp a space which the user's eyes are mostly turned upon in the specific space through collection of the eye information of the user of the electronic device 400. As an additional example, the electronic device 400 may grasp the real object that is good to display the virtual object based on the physical characteristics, and may arrange a virtual screen in a most suitable space, such as a living room wall, through the grasped real object. As an additional example, the electronic device 400 may arrange the virtual object in consideration of additional elements related to the kind and the characteristic of the virtual object or application in addition to the corresponding information.

The electronic device 400 according to an embodiment of the present disclosure may map a supported function on a specific portion of the real object or the real object or the electronic device 400 itself. For example, a stylus write function may be mapped on a tip portion of an actual pencil, and a stylus erase function may be mapped on the other end portion of the pencil. After the function mapping is completed, the pencil may be used as a stylus tool through the electronic device 400.

The function of the pencil that is the physical real object according to an embodiment may be extended to a virtual world, and may be used as a tool that can take charge of a specific function of the virtual world. For example, a broom may be mapped on a tennis racket to be used in a virtual world tennis game. The electronic device 400 according to an embodiment may recognize the broom, define the feature of the corresponding real object through physical and radio wave features, and give a game controller function to the corresponding broom. In the above-described example, the pencil or the broom does not have any electronic device to serve as a stylus or game controller, but a specific function may be given to a specific region to be used through the electronic device 400.

The electronic device 400 according to an embodiment of the present disclosure may display the virtual object in a state where the virtual object is coupled to the real object. For example, if there is a base type robot that includes wheels and a controller, arm and face portions of the robot are virtually created to be coupled to the base type robot so that the coupled robot can be used as one object. The easiness of user's control may be heightened through mapping of a specific function on the virtual object. For example, a remote control function may be mapped on a wood piece through the electronic device 400. In this case, the electronic device 400 may make buttons that are virtual objects overlap the wood piece, and when the user uses the corresponding wood piece as a remote controller, the buttons that overlap the real object may be used to perform the remote control function more smoothly.

The virtual object according to an embodiment of the present disclosure may be located on the button or within a distance adjacent to the button to make it possible to perform a control function that can be controlled by the user as in the following picture or to perform a portion related to the electronic device 400, such as an additional information display window. In this case, the mapped information may include not only control of a function of the electronic device 400 itself but also functions of external devices that are connected to the electronic device 400 to be controlled. For example, the information may be the control of a temperature or humidity of a room or adjustment of volumes of video devices connected to the electronic device 400.

Even if a real thing is not a device having no function, but is a machine or a product having a specific electronic device, the electronic device 400 according to an embodiment may perform mapping of the functions. In this case, the function mapping may be used for the purpose of extending the function of the existing real device through convergence with the electronic device 400 in addition to the control of the function of the device that is in the existing reality. For example, if there is an indoor lamp having a wireless interface with adjustable illumination, the user may map the interface of which illumination can be controlled through the electronic device 400 on the real indoor lamp, and if a user's hand touches the indoor lamp, the electronic device 400 may be set to change the illumination in stages when the hand touches the indoor lamp. In this case, the electronic device 400 may recognize that the user touches the real thing, and may be connected to the indoor lamp to transmit a control signal thereto so that the illumination of the indoor lamp can be actually changed. In the case where the indoor lamp actually operates to express light of a specific color, the electronic device 400 can extend the function of the indoor lamp up to light that the indoor lamp is actually unable to express through rendering to give an effect to the virtual space.

The electronic device 400 according to an embodiment of the present disclosure may include a communication unit 440 and a processor 410 electrically connected to the communication unit 440, such that the processor 410 may be configured to receive application related information from at least one external device, to recognize an external shape of a screen that becomes a reference for displaying the application of the at least one external device, and to display a virtual object on one region that is determined based on the recognized external shape of the screen on the basis of the received application related information.

The processor 410 according to an embodiment of the present disclosure may be configured to display the virtual object based on at least one of size information of the recognized screen and screen information of the screen. The one region that is determined based on the recognized external shape of the screen may be a virtual region that is within a predetermined distance from the physical boundary region of the screen for displaying the application of the at least one external device.

The processor 410 according to an embodiment of the present disclosure may be configured to display the virtual object based on the application being executed in the background of the at least one external device. If a change signal according to updating of the application related information is received from the at least one external device, the processor 410 may be configured to update the displayed virtual object based on the received change signal, and if an input event through one input device of the at least one external device is sensed with respect to the virtual object, the processor 410 may be configured to update the virtual object corresponding to the sensed input event.

The processor 410 according to an embodiment of the present disclosure may be configured to display the virtual object based on application information included in the first external device 600, to sense an input event for an image item included in the virtual object through an input device of the second external device 700 including the screen, and to transmit a related signal to the second external device 700 so that an application corresponding to the image item is displayed on a screen of the second external device 700 based on the sensed input event.

The processor 410 according to an embodiment of the present disclosure may be configured to transmit a related signal to the first external device 600 if an input event for moving one item that is displayed on the screen of the second external device 700 to the virtual object is sensed.

The processor 410 according to an embodiment of the present disclosure may be configured to display a virtual extended screen having an extended size in comparison to the recognized screen size on a virtual region. The processor 410 may be configured to display a plurality of virtual extended screens having different depth information. Virtual objects that are displayed on the respective virtual extended screens may be displayed on the basis of at least one of an application kind and predetermined virtual object arrangement information.

Figure 5:
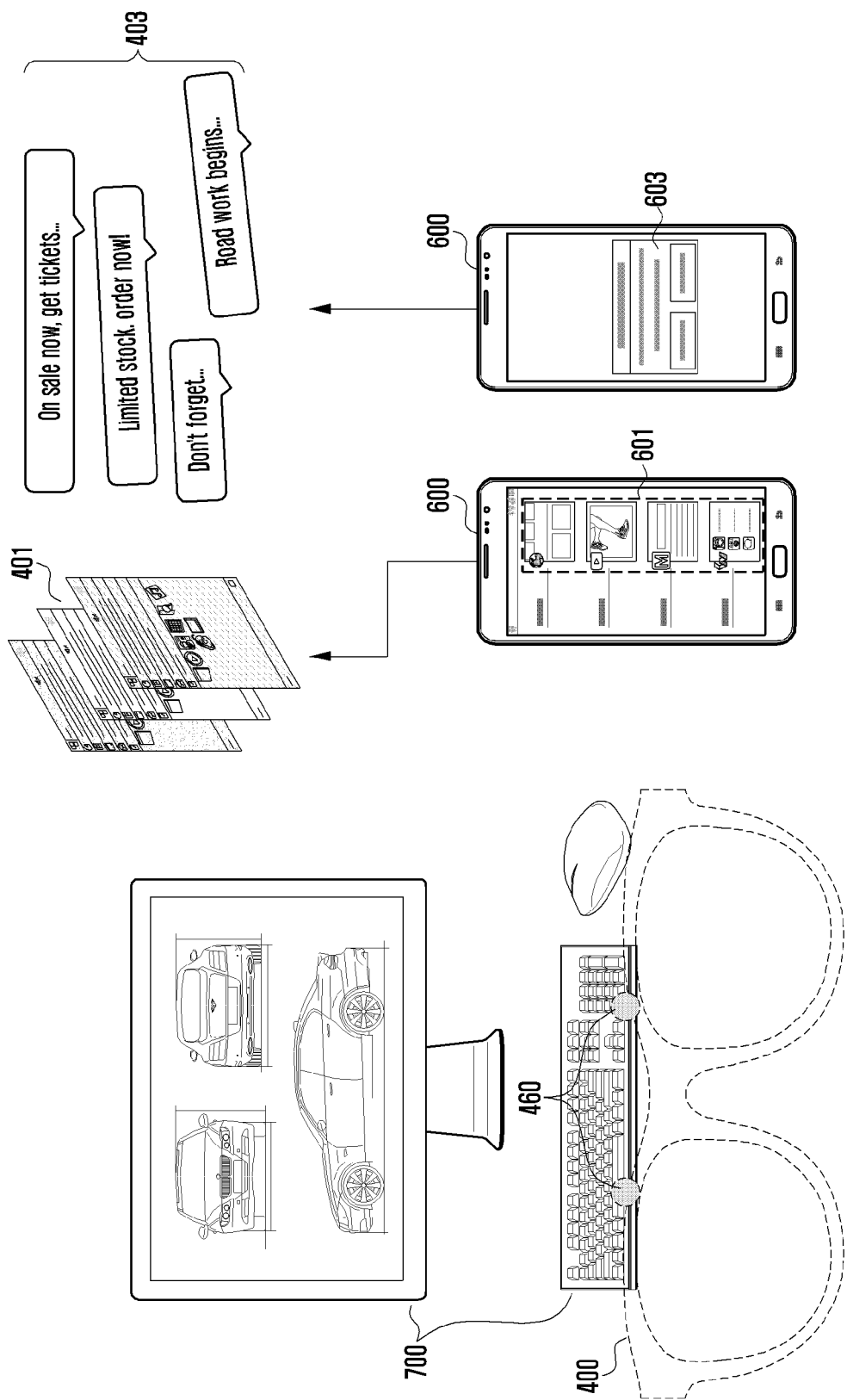
FIG. 5 is a diagram illustrating display of virtual objects through an electronic device according to various embodiments of the present disclosure.

FIG. 5 is a diagram illustrating display of virtual objects through an electronic device 400 according to various embodiments of the present disclosure.

Referring to FIG. 5, the electronic device 400 according to various embodiments of the present disclosure may display virtual objects.

The electronic device 400 according to various embodiments of the present disclosure may be mounted with a glasses-type camera (e.g., "depth" camera as utilized below, IR camera, or high-resolution camera) 460. The first external device 600 may be a portable terminal, and the second external device 700 may be a Personal Computer (PC) including a display screen.

The electronic device 400 may display an application 601 that is also being executed on the background of the first external device 600. The application 601 may be displayed as a virtual object 401 for the electronic device 400 on a virtual region that is rendered as appearing within a predetermined distance from the physical screen of the second external device 700.

If a notification message (e.g., push message) 603 is received on the first external device 600, the electronic device 400 according to various embodiments of the present disclosure may display virtual objects 403 corresponding to the received notification message on the virtual region.

The virtual objects 401 and 403 may be formatted for display in accordance with (or based on) the screen size of the display of the second external device 700, resolution information of the screen, and the font size of the screen.

Figure 6B:
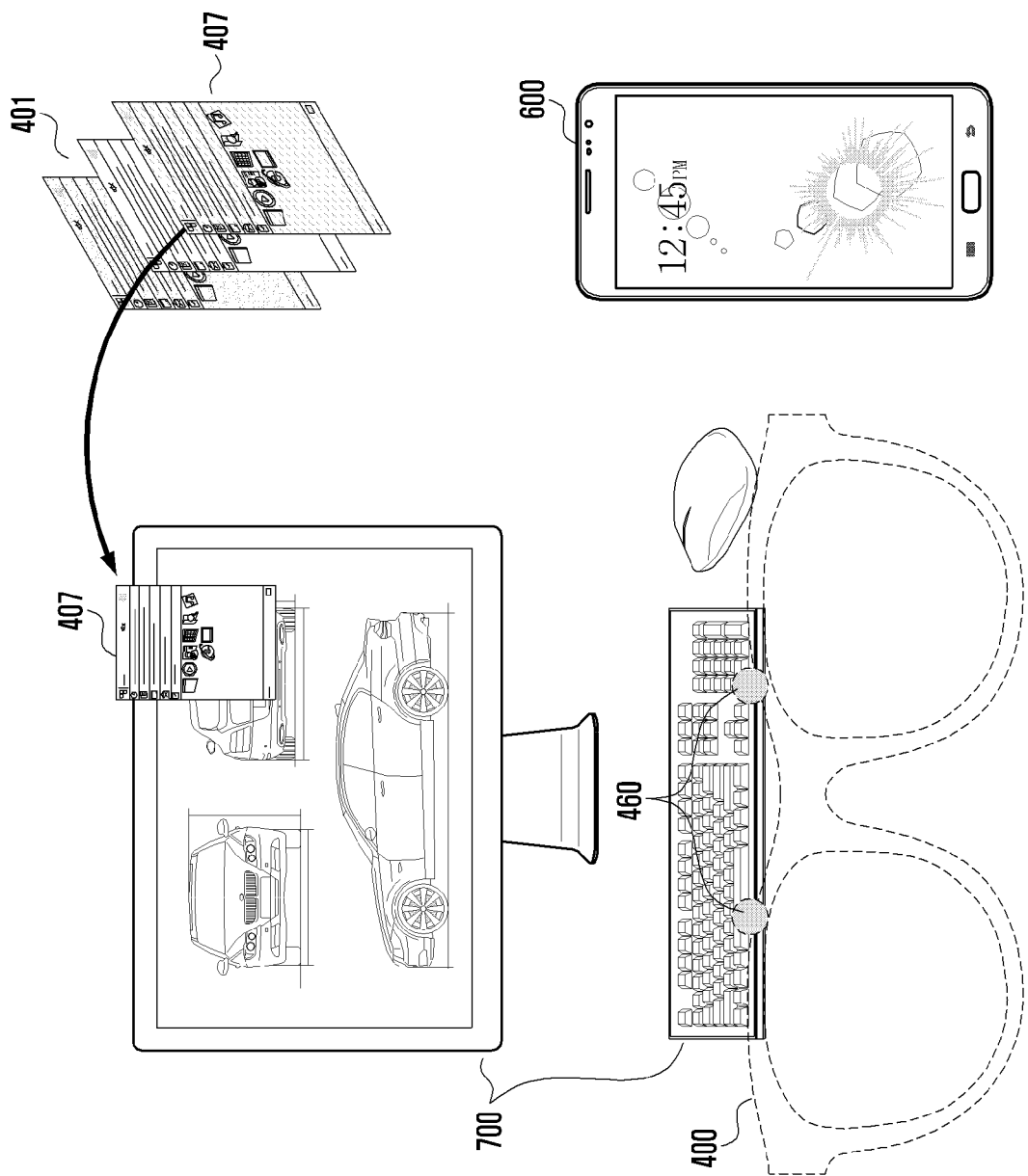

FIGS. 6A and 6B illustrate virtual objects that are displayed by an electronic device 400 according to various embodiments of the present disclosure.

Referring to FIG. 6A, if a new event (e.g., text message reception, SNS update, or communication application update) occurs in the first external device 600, the electronic device 400 may change the virtual objects that are being displayed. For example, if a text application update occurs in the first external device 600, the electronic device 400 may change the arrangement of the virtual objects 401 as seen in FIG. 6A so that the virtual object of the latest updated text application is displayed on a "foremost" region or side, via changing the order of the virtual objects 401 displayed for the respective applications.

Referring to FIG. 6B, if an input event is detected (or sensed) for one virtual object 407 from among a plurality of virtual objects 401 displayed on the electronic device 400, the second external device 700 may display an application corresponding to the virtual object 407 on the screen of the second external device 700. If an input event for one virtual object 407 is detected, the first external device 600 may transfer application related information corresponding to the virtual object 407 to the second external device 700.

In an embodiment of the present disclosure, user input for the electronic device 400 and the external devices 600 and 700 may interoperate with the virtual region. For example, if a pointer or a cursor of the input device (e.g., mouse) of the second external device 700 that is being displayed on the screen of the second external device 700 exceeds the physical boundary of the screen, the electronic device 400 may switch a mode of an existing user input tool that has been used and control a virtual object that is located on the virtual region.

In an embodiment of the present disclosure, the electronic device 400 may recognize that the pointer or the cursor of the input device of the second external device 700 exceeds the physical boundary of the screen. The recognition of the pointer or the cursor may be performed through visual recognition of the electronic device 400, recognition by a sensor device that is located on an outside, such as an external camera, or recognition by sharing I/O information (e.g., location information of the mouse cursor) between the electronic device 400 and the second external device 700.

In an embodiment of the present disclosure, the mode of the user input tool may be changed from 2D to 3D to perform operations on such the virtual region. Once the mode switching is performed, the user of the electronic device 400 may control the virtual object using the existing input device (e.g., means). This may be a method that enables a button or an additional input device to be operable on a mouse or a keyboard.

For example, the virtual object 407 is selected using an input device (e.g., mouse) of the second external device 700, and if a subsequent input event (e.g., drag-and-drop event or double click) is sensed, the second external device 700 may display an application corresponding to the virtual object 407 on the screen. As an additional example, user gesture information (e.g., motion information, touch input information, or touch swipe input information) for the electronic device 400 may be utilized as an input as well, in which the second external device 700 may display an application corresponding to the one virtual object 407 on the screen.

Figure 7A:
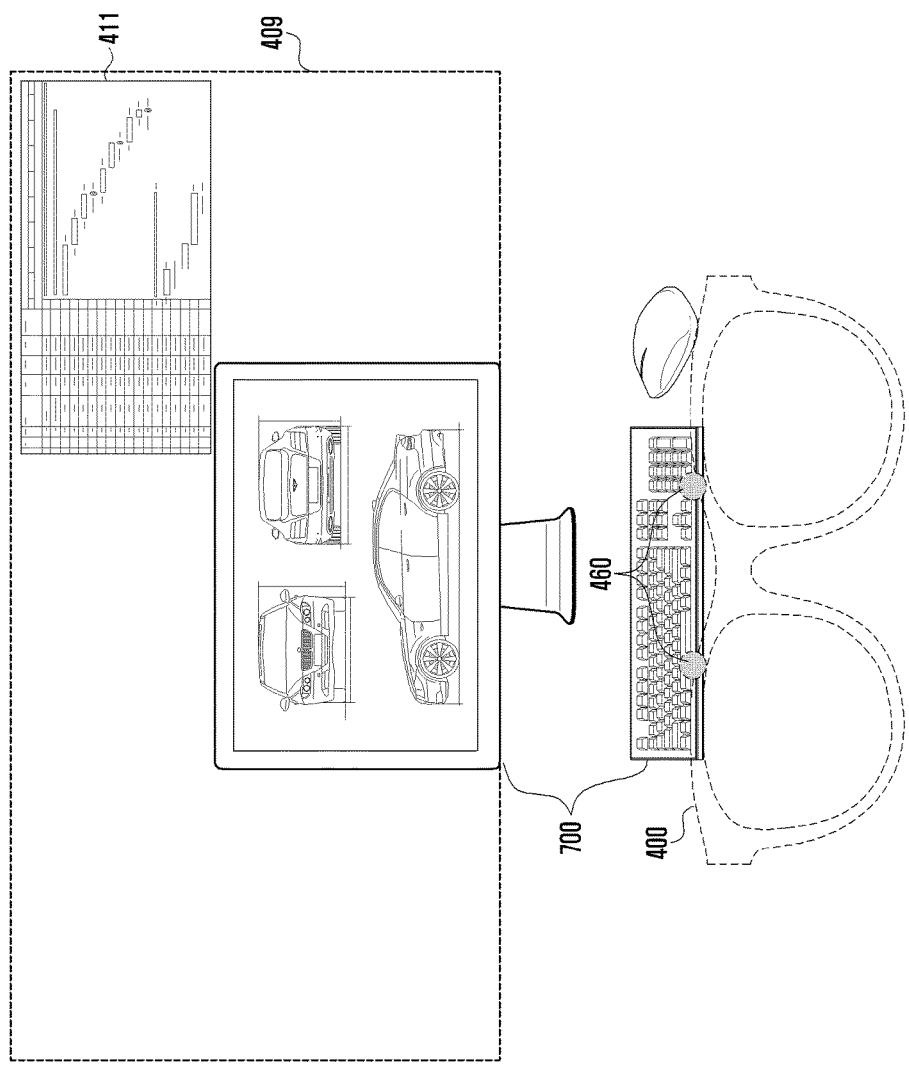
FIG. 7A and FIG. 7B are diagrams illustrating virtual extended screens of an electronic device according to various embodiments of the present disclosure.
Figure 7B:
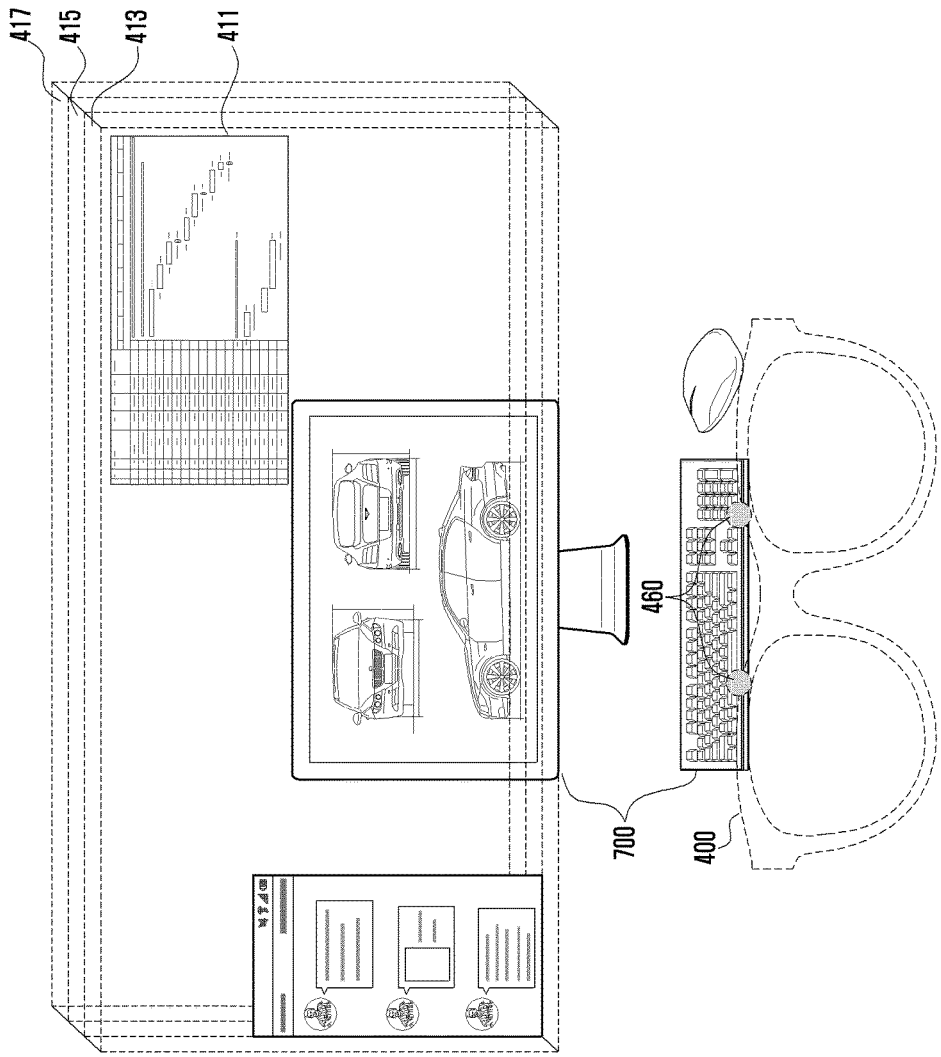

FIGS. 7A and 7B are diagrams illustrating virtual extended screens of an electronic device 400 according to various embodiments of the present disclosure.

Referring to FIG. 7A, the electronic device 400 may display a virtual extended screen 409 that is 'extended' from the physical screen of the second external device 700. The electronic device 400 may further display a virtual object 411 on the virtual extended screen 409. The size of the virtual extended screen may be any desirable multiplicative desired, such as 1.5 times, 3 times, or 4 times the size (in width and length) of the screen of the second external device 700, and may be further designated or changed by the user. The virtual object 411 that is displayed on the virtual extended screen 409 may be displayed based on the display resolution of the second external device 700, and/or attributes (e.g., font, size, and kind) of content being displayed therein.

Referring to FIG. 7B, the electronic device 400 may hierarchically display a plurality of virtual extended screens 413, 415, and 417, which are extended from the screen of the second external device 700 and separate according to different virtual depths (e.g., depth information). One or more of the respective virtual extended screens 413, 415, and 417 may display or otherwise include the virtual object 411.

The virtual object that is displayed on the respective virtual extended screens 413, 415, and 417 may be categorically displayed according to the type (e.g., kind) of applications, and/or according to predetermined virtual object arrangement information.

For example, communication related virtual objects (e.g., SNS application or text application) may be displayed on the first virtual extended screen 413, task related virtual objects (e.g., document related application) may be displayed on the second virtual extended screen 415, and user interest related virtual objects (e.g., shopping application or favorite restaurant application) may be displayed on the third virtual extended screen 417. As an additional example, the virtual objects that are displayed on the respective virtual extended screens 413, 415, and 417 may be discriminated and/or categorized for display in accordance with a processor usage (e.g., clock cycles or speed value) required by the application, or a resolution to be utilized (e.g., display resolution value required). For example, a memo application would be less processor intensive or require lower resolutions compared against 3D game application.

Figure 8B:
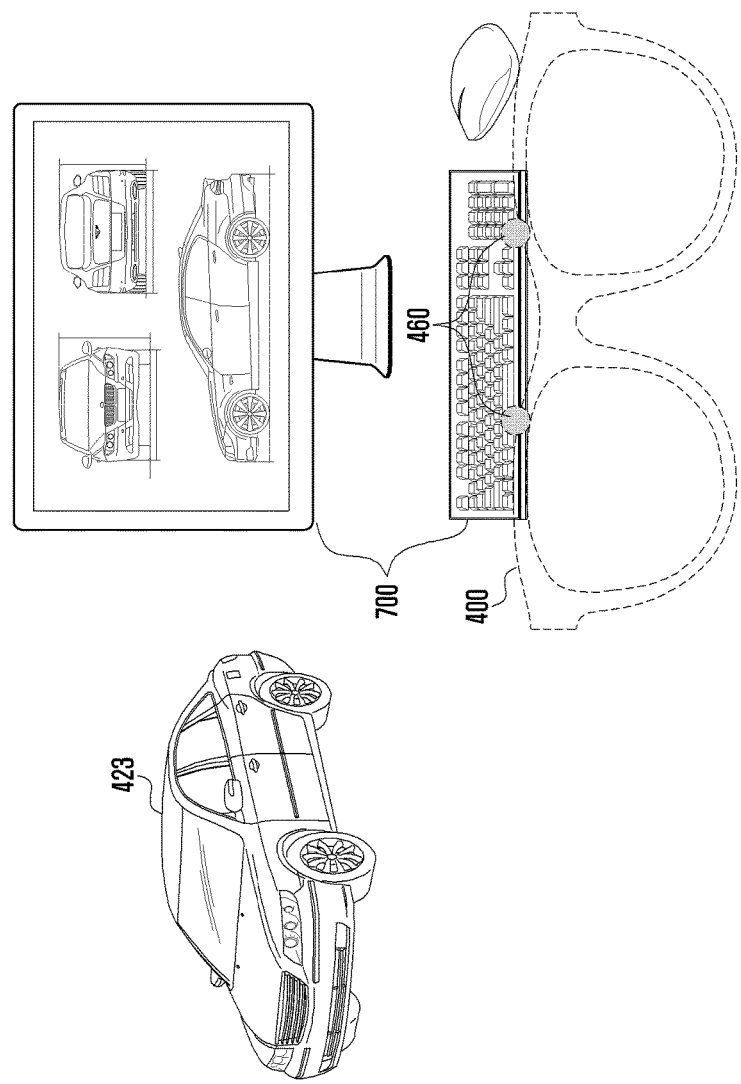

FIGS. 8A and 8B are diagrams illustrating display of virtual objects through an electronic device 400 according to various embodiments of the present disclosure.

Referring to FIG. 8A, the electronic device 400 may display a virtual messenger object 419 on or over a "virtual region" in relation to a physical object. For example, the electronic device 400 may simulate display of the virtual messenger object 419 based on the location of an actual physical cup 421. For example, the electronic device 400 may display the virtual messenger object 419 in the vicinity of the physical cup 421. Further, if the physical cup 421 moves, the electronic device 400 may display the virtual messenger object 419 as moving correspondingly in tandem with the motion of the physical cup 421. Even further, when the virtual messenger object 419 is displayed, the electronic device 400 uses the location of the physical cup 421 as an initial space coordinate value, and thereafter, may move and display the virtual messenger object 419 independently of the actual mug cup 421.

Referring to FIG. 8B, the electronic device 400 may display a "holographic" virtual object 423. If a displayable object (e.g., automobile image or object image) includes 3D information, the electronic device 400 may display the object in the form of a "hologram" within the virtual region. That is, the object 423 may be viewed in three dimensions if the user wearing the device 400 were to move around the object 423 within real and physical space. In the case where the object that is being displayed on the screen of the virtual region is displayed on the virtual region according to a movement input event, the electronic device 400 according to an embodiment may display the object in the form of a hologram.

FIG. 9 is a diagram illustrating display of virtual objects through an electronic device according to various embodiments of the present disclosure.

Referring to FIG. 9, the electronic device 400 may set a virtual region for display a virtual object and may display the virtual object on the set virtual region.

Referring to element 901, spatial information may be acquired through a depth camera 460 (e.g., a camera capable of capturing depth perception) of the electronic device 400. The depth camera 460 according to an embodiment may be utilized to recognize a physical shape of the (external) screen of the second external device 700.

Referring to element 903, the electronic device 400 may set a virtual region for displaying a virtual object based on an application executing in the first external device 600 in physical space. The electronic device 400 may set the virtual region to be within a predetermined distance from the physical boundary surface of the physical screen of the second external device 700, and determine this to be a region for displaying the virtual object. As seen in element 905, the electronic device 400 may display the virtual object 423 based on the application beside the screen of the second external device 700.

Figure 10:
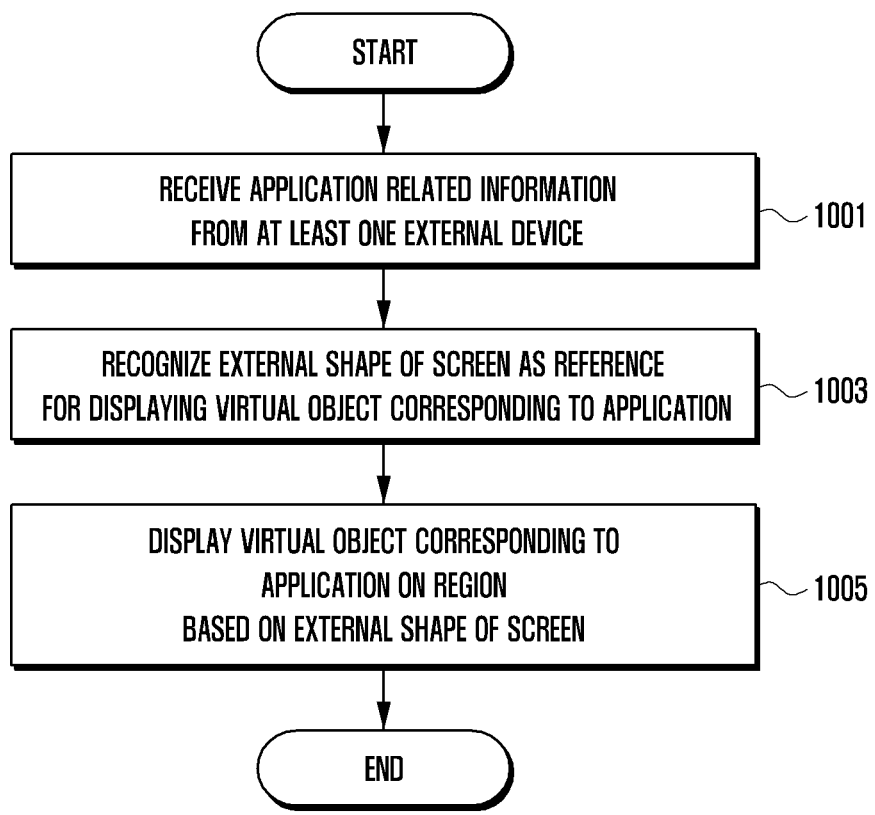
FIG. 10 is a flowchart explaining display of virtual objects through an electronic device according to various embodiments of the present disclosure.

FIG. 10 is a flowchart explaining display of virtual objects through an electronic device according to various embodiments of the present disclosure, based on reference to an external and physical screen.

In operation 1001, the electronic device 400 may receive application related information from at least one external device, which is to be displayed as a virtual object in relation to some external and physical screen. The electronic device 400 may the virtual object using at least one of size information of the external screen, and screen information (e.g., a characteristic, such as display resolution, refresh rate, etc.) of the external screen.

In operation 1003, the electronic device 400 may recognize (e.g., detect) a shape of the external screen, setting the external screen as a reference for displaying the virtual object based on the application of at least one external device.

In operation 1005, the electronic device 400 may display the virtual object on a region that is set according to the recognized external shape of the external screen. The region set according to the recognized external shape of the screen may be a virtual region disposed within a predetermined physical distance from a physical boundary region of the screen.

According to one embodiment, the electronic device 400 may display the virtual object based on the application being executed on the background of the at least one external device.

Figure 11:
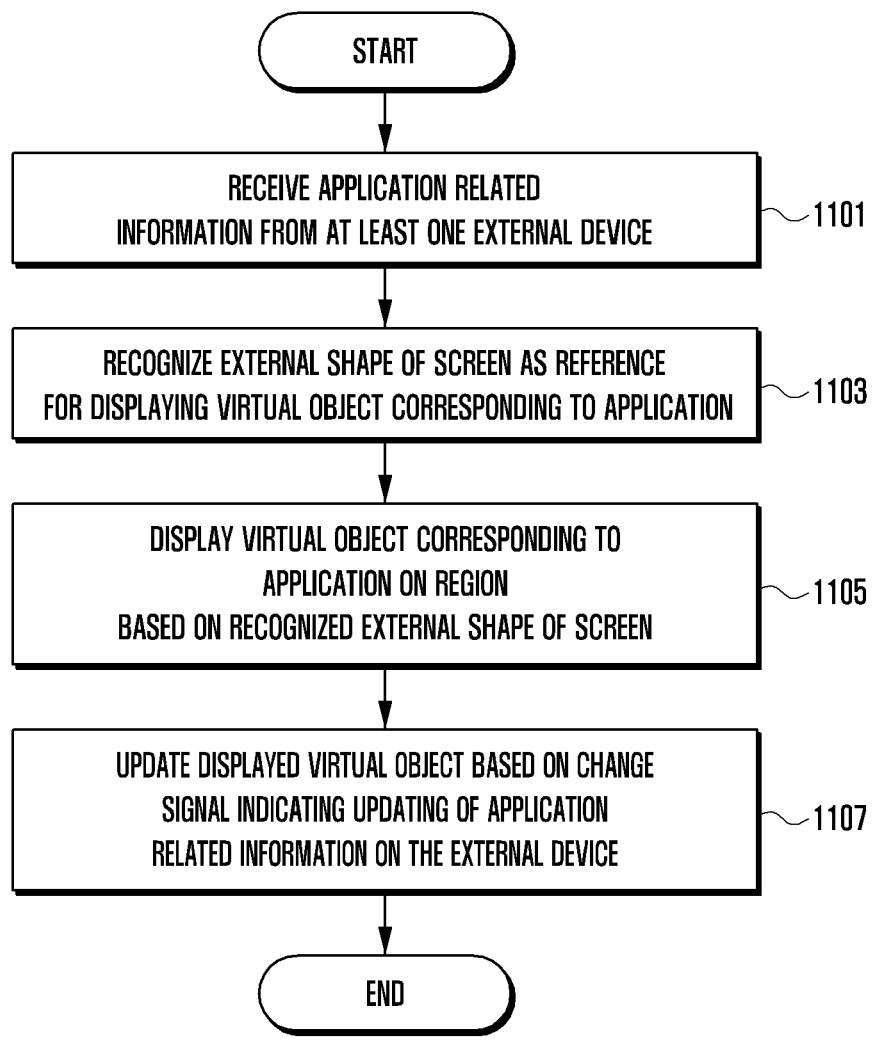
FIG. 11 is a flowchart explaining display of virtual objects through an electronic device according to various embodiments of the present disclosure.

FIG. 11 is a flowchart explaining display of virtual objects through an electronic device 400 according to various embodiments of the present disclosure.

In operation 1101, the electronic device 400 may receive application related information from at least one external device, which is to be displayed as a virtual object in relation to a physical external display screen. The electronic device 400 according to an embodiment may display the virtual object based on at least one of size information of the external screen and screen information or characteristic of the external screen.

In operation 1103, the electronic device 400 may recognize a shape of the external screen, setting the external screen as a reference for displaying the virtual object based on the application of the at least one external device.

In operation 1105, the electronic device 400 may display the virtual object in a region set according to the recognized external shape of the external screen, the virtual object based on the received application related information. The region positioned based on the shape of the screen may be a virtual region disposed within a predetermined distance from the physical boundary region of the screen for displaying the virtual object based on the application of the at least one external device.

In operation 1107, if a change signal is received from the external device indicating some updating of the application related information, the electronic device 400 may update the displayed virtual object based on the received change signal.

If an input event through one input device of the at least one external device is detected with respect to the virtual object, the electronic device 400 according to an embodiment of the present disclosure may update the virtual object corresponding to the detected input event.

Figure 12:
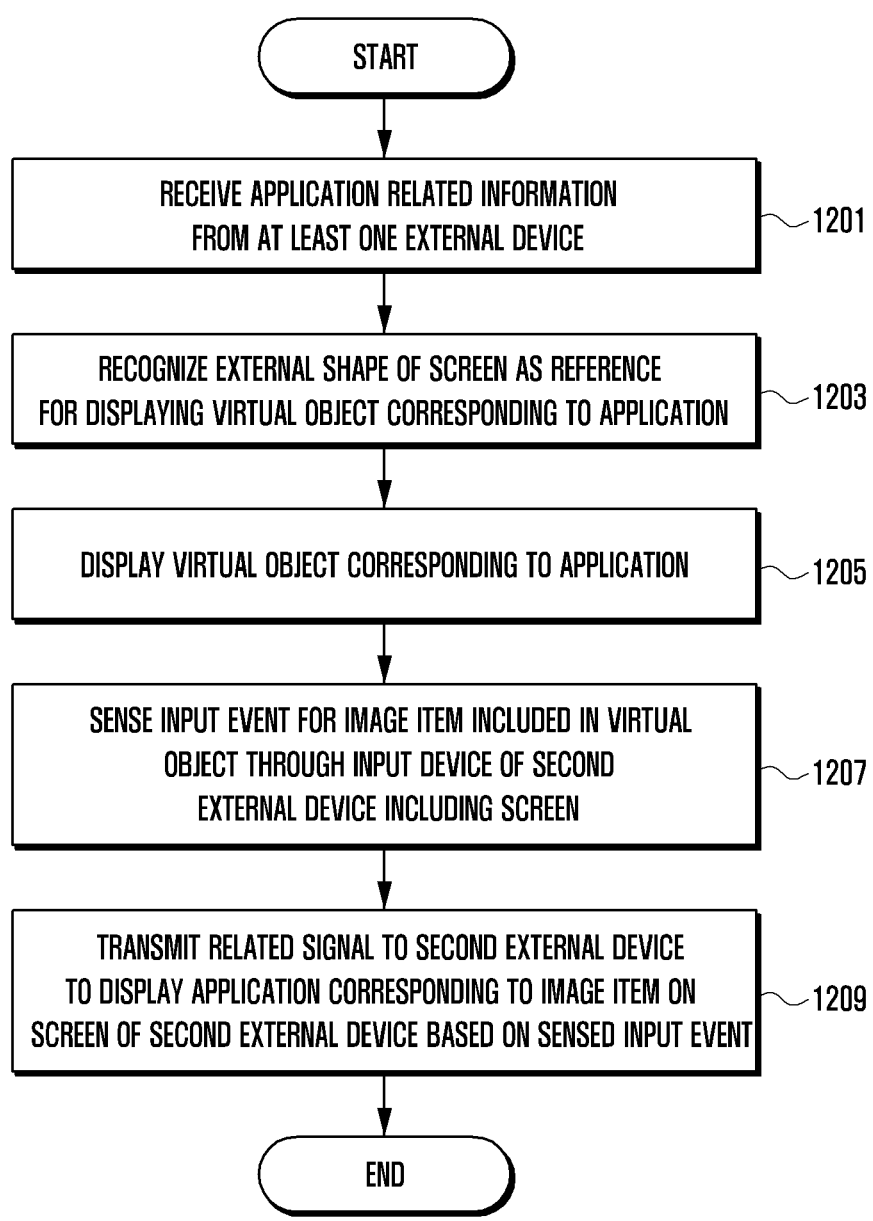
FIG. 12 is a flowchart explaining display of virtual objects through an electronic device according to various embodiments of the present disclosure.

FIG. 12 is a flowchart explaining display of virtual objects through an electronic device according to various embodiments of the present disclosure.

In operation 1201, the electronic device 400 may receive application related information from at least one external device, which is to be displayed as a virtual object in relation to a physical display screen. The electronic device 400 according to an embodiment may display the virtual object based on at least one of size information of the external screen, and screen information of the external screen. The at least one external device may be a first external device 600, as seen for example in FIGS. 4-6B.

In operation 1203, the electronic device 400 may recognize the external shape of the physical screen as a reference for displaying a virtual object based on the application of at least one external device from which the application related information was generated. The at least one external device may be a second external device 700, as seen for example in FIGS. 4-6B.

In operation 1205, the electronic device 400 may display the virtual object.

In operation 1207, the electronic device 400 may detect (e.g., sense) an input event for a particular display item included in display of the virtual object. The input event may be detected through an input device of the second external device 700, which includes the external screen.

In an embodiment of the present disclosure, user input for the electronic device 400 and the external devices 600 and 700 may interoperate with the virtual region. For example, if a pointer or a cursor of the input device (e.g., mouse) of the second external device 700 that is being displayed on the screen of the second external device 700 exceeds the physical boundary of the screen, the electronic device 400 may switch a mode of an existing user input tool that has been used and control a virtual object that is located on the virtual region.

In an embodiment of the present disclosure, the electronic device 400 may recognize that the pointer or the cursor of the input device of the second external device 700 exceeds the physical boundary of the screen. The recognition of the pointer or the cursor may be performed through visual recognition of the electronic device 400, recognition by a sensor device that is located on an outside, such as an external camera, or recognition by sharing I/O information (e.g., location information of the mouse cursor) between the electronic device 400 and the second external device 700.

In an embodiment of the present disclosure, the mode of the user input tool may be changed from 2D to 3D to perform operations on such the virtual region. Once the mode switching is performed, the user of the electronic device 400 may control the virtual object using the existing input device (e.g., means). This may be a method that enables a button or an additional input device to be operable on a mouse or a keyboard.

In operation 1209, the electronic device 400 may transmit a related signal to the second external device 700 to display an application (or function) corresponding to the particular display item for which the input event was detected. The resulting application (or function) may be displayed on the external screen of the second external device 700 based on the detected input event.

The electronic device 400 according to an embodiment of the present disclosure may display a virtual extended screen having an extended size relative to the recognized screen size on a virtual region. The electronic device 400 may display a plurality of virtual extended screens having different visual depths (e.g., depth information) to distinguish between them. Virtual objects that are displayed on the respective virtual extended screens may be displayed based on at least one of an application kind and predetermined virtual object arrangement information.

The electronic device 400 according to an embodiment of the present disclosure may perform at least one of receiving application related information from at least one external device, recognizing an external shape of a screen that becomes a reference for displaying the application of the at least one external device, displaying the virtual object on one region that is determined based on the recognized external shape of the screen on the basis of the received application related information, and displaying the virtual object based on at least one of size information of the recognized screen and screen information of the screen. The one region determined based on the recognized external shape of the screen according to an embodiment may be a virtual region within a predetermined distance from a physical boundary region of the screen for displaying the application of the at least one external device.

The electronic device 400 according to an embodiment of the present disclosure may perform at least one of displaying the virtual object based on the application being executed on a background of the at least one external device; if a change signal according to updating of the application related information is received from the at least one external device, updating the displayed virtual object based on the received change signal; and if an input event through one input device of the at least one external device is sensed with respect to the virtual object, updating the virtual object corresponding to the sensed input event.

The electronic device 400 according to an embodiment of the present disclosure may perform at least one of displaying the virtual object based on application information included in a first external device; sensing an input event for an image item included in the virtual object through an input device of a second external device including the screen; transmitting a related signal to the second external device so that an application corresponding to the image item is displayed or executed on a screen of the second external device based on the sensed input event; transmitting the related signal to the first external device if an input event for moving one item that is displayed on the screen of the second external device to the virtual object is sensed; and displaying a virtual extended screen having an extended size in comparison to the recognized screen size on a virtual region.

The virtual objects that are displayed on the respective virtual extended screens may be displayed on the basis of at least one of an application kind and predetermined virtual object arrangement information. The electronic device 400 according to an embodiment of the present disclosure may operate to display a plurality of virtual extended screens having different depth information.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

It will be understood that the above-described embodiments are examples to help easy understanding of the contents of the present disclosure and do not limit the present disclosure. Accordingly, the present disclosure is defined by the appended claims, and it will be construed that all corrections and modifications derived from the meanings of the following claims and the equivalent concept fall within the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. An electronic device, comprising:
a display;
a communication unit; and
a processor configured to:
receive application related information from at least one external device,
set a reference for displaying a virtual object corresponding to the received application related information by detecting a physical shape of an external screen of the at least one external device, display the virtual object on the display in a region based on the set reference for the received application related information, detect an input event via at least one of an input device of the at least one external device or a gesture input of the electronic device, and update, in response to the input event, the displayed virtual object, wherein the region comprises a plurality of virtual extended screens extending from a border of the physical shape of the external screen, each virtual extended screen disposed at a different virtual depth.

2. The electronic device of claim 1, wherein the virtual object is displayed based on at least one of a size of the external screen, and a display characteristic of the screen.

3. The electronic device of claim 1, wherein the plurality of virtual extended screens are disposed a predetermined distance from a physical boundary of the external screen.

4. The electronic device of claim 1, wherein the processor is configured to display the virtual object in response to detecting that an application from which the application related information is received is executed in a background state of the at least one external device.

5. The electronic device of claim 1, wherein the processor is configured to:
in response to receiving a change signal indicating updating of the application related information from the at least one external device, update the displayed virtual object based on the received change signal.

6. The electronic device of claim 1, wherein the at least one external device includes a first external device and a second external device that includes the external screen, the processor further configured to:
detect an input event to an image item included in the virtual object via an input device of the second external device, and
transmit a signal related to the input event to the second external device causing an application corresponding to the image item to be displayed or executed on the external screen of the second external device.

7. The electronic device of claim 6, wherein the processor is configured to:
transmit the related signal to the first external device in response to detecting the input event moving one item displayed on the external screen to the virtual object.

8. The electronic device of claim 1, wherein a plurality of virtual objects are categorized into groups according to at least one of a type of application associated with each virtual object, and a predetermined virtual object arrangement, and
wherein the processor controls the display to divide the plurality of virtual objects among the plurality of virtual extended screens according to the groups.

9. The electronic device of claim 1, wherein the display is configured to provide an Augmented Reality (AR) display screen, the electronic device further comprising:
at least one of a camera module and a sensor module, configured to capture image information including at least one of spatial information and object information.

10. A method in an electronic device, comprising:
receiving application related information from at least one external device;
detecting a physical shape of an external screen to set a reference for displaying a virtual object corresponding to the received application related information;
displaying the virtual object in a region of a display based on the set reference for the received application related information;
detecting an input event via at least one of an input device of the at least one external device or gesture input of the electronic device; and
updating, in response to the input event, the displayed virtual object,
wherein the region comprises a plurality of virtual extended screens extending from a border of the physical shape of the external screen, each virtual extended screen disposed at a different virtual depth.

11. The method of claim 10, wherein the virtual object is displayed based on at least one of a size of the external screen and a display characteristic of the external screen.

12. The method of claim 10, wherein the plurality of virtual extended screens are disposed a predetermined distance from a physical boundary of the external screen.

13. The method of claim 10, wherein the virtual object is displayed in response to detecting that an application from which the application related information is received is executed in a background state of the at least one external device.

14. The method of claim 10, further comprising:
in response to receiving a change signal indicating updating of the application related information from the at least one external device, updating the displayed virtual object based on the received change signal.

15. The method of claim 10, wherein the at least on external device includes a first external device and a second external device that includes the external screen, the method further comprising:
detecting an input event to an image item included in the virtual object via an input device of the second external device, and
transmitting a signal related to the input event to the second external device causing an application corresponding to the image item to be displayed or executed on the external screen of the second external device.

16. The method of claim 15, further comprising: transmitting the related signal to the first external device in response to detecting the input event moving one item displayed on the external screen to the virtual object.

* * * * *